(12) United States Patent
Rowe

(10) Patent No.: US 6,944,996 B1
(45) Date of Patent: Sep. 20, 2005

(54) HURRICANE RESISTANT STRUCTURE

(75) Inventor: William C. Rowe, North Stonington, CT (US)

(73) Assignee: Drawings Plus, LLC, North Stonington, CT (US)

( * ) Notice: Subject to any disclaimer, the term of this patent is extended or adjusted under 35 U.S.C. 154(b) by 67 days.

(21) Appl. No.: 10/107,000

(22) Filed: Mar. 25, 2002

Related U.S. Application Data
(60) Provisional application No. 60/278,184, filed on Mar. 23, 2001.

(51) Int. Cl.[7] .............................................. E04H 14/00
(52) U.S. Cl. ............................ 52/236.1; 52/66; 52/200; 52/79.4; 52/82
(58) Field of Search ............................ 52/66, 82, 79.4, 52/200

(56) References Cited

U.S. PATENT DOCUMENTS

| | | | |
|---|---|---|---|
| 3,068,534 A | * | 12/1962 | Hu |
| 3,139,958 A | * | 7/1964 | Witt |
| 3,333,373 A | * | 8/1967 | Taylor et al. |
| 3,727,355 A | * | 4/1973 | Vachon ......................... 52/246 |
| 3,996,706 A | * | 12/1976 | Bomgaars ....................... 52/71 |
| 4,015,381 A | * | 4/1977 | Schmidt ....................... 52/199 |
| 4,065,906 A | * | 1/1978 | Mears ......................... 52/745 |
| 4,158,941 A | * | 6/1979 | Diana .......................... 52/741 |
| 4,332,116 A | * | 6/1982 | Buchanan ....................... 52/82 |
| 4,434,595 A | * | 3/1984 | de Brabant ................ 52/236.2 |
| 4,598,515 A | * | 7/1986 | Diana ........................ 52/236.1 |
| 4,640,061 A | * | 2/1987 | Trumley ........................ 52/71 |
| 4,672,779 A | * | 6/1987 | Boyd .......................... 52/79.4 |
| 5,029,420 A | * | 7/1991 | Goto ............................. 52/82 |

* cited by examiner

Primary Examiner—Carl D. Friedman
Assistant Examiner—Yvonne M. Horton
(74) Attorney, Agent, or Firm—Wiggin and Dana LLP; Gregory S. Rosenblatt; Anthony P. Gangemi

(57) ABSTRACT

A residential structure preferably has an N-sided polygonal footprint which has a central vertical axis. Inner walls separate a central common area from a number of outer individual residential units, each such unit occupying a sector of the footprint along an associated side thereof. Advantageously, the central common area includes a pool in a courtyard.

21 Claims, 28 Drawing Sheets

HURRICANE RESISTANT STRUCTURE

CROSS-REFERENCE TO RELATED APPLICATION

Priority is claimed of provisional patent application Ser. No. 60/278,184, entitled "Hurricane Resistant Structure" and filed Mar. 23, 2001, the disclosure of which is incorporated by reference herein as if set forth at length.

BACKGROUND

This invention relates to buildings in general and to low-rise multi unit residential buildings, in particular.

BRIEF SUMMARY OF THE INVENTION

A residential structure preferably has an N-sided polygonal footprint which has a central vertical axis. Inner walls separate a central common area from a number of outer individual residential units, each such unit occupying a sector of the footprint along an associated side thereof. Advantageously, the central common area includes a pool in a courtyard. N is advantageously at least six.

Advantageously, one of the sectors may include common areas such as a first floor entry corridor to the central common area and a second floor common room thereabove.

A structure may have a roof with an outer portion substantially covering the individual residential units and an inner portion substantially covering the central common area and being operatively shiftable between lowered and raised conditions. A central mast may in major part support the inner roof in at least the raised condition. A hydraulic actuator may raise and lower the mast to shift the inner roof by an exemplary amplitude of between two and ten feet. A series of remotely-actuated latches may selectively secure the inner roof to the outer roof in the lowered condition. The inner and outer roofs may each include an aluminum/composite layer extending over a major portion of such roof and contributing a substantial fraction of the strength of such roof. Each of a plurality of the units may include a floor separating upper and lower levels of such unit at least along a major portion of the footprint of such unit.

Each of a plurality of the units may include walls defining a garage bay extending inward at a 90° angle to the associated side of the structure. The bay may have a door at an outboard end thereof and be of an effective size to permit ingress and egress of an automobile at least six feet wide, five feet high, and fifteen feet long.

Advantageously, every residential unit in the structure includes a reinforced safe room which may be a bathroom or portion thereof. The safe room may include, on at least portions of four sides, a reinforced concrete selected from the group consisting of poured-in-place concrete, cinder blocks, and pre-cast concrete and further having a steel door.

Each unit, along a major portion of the associated side, may have a reinforced concrete wall extending for a height of between one and one-half and five feet and having an arcuate outer profile.

DETAILED DESCRIPTION

Figure 1:
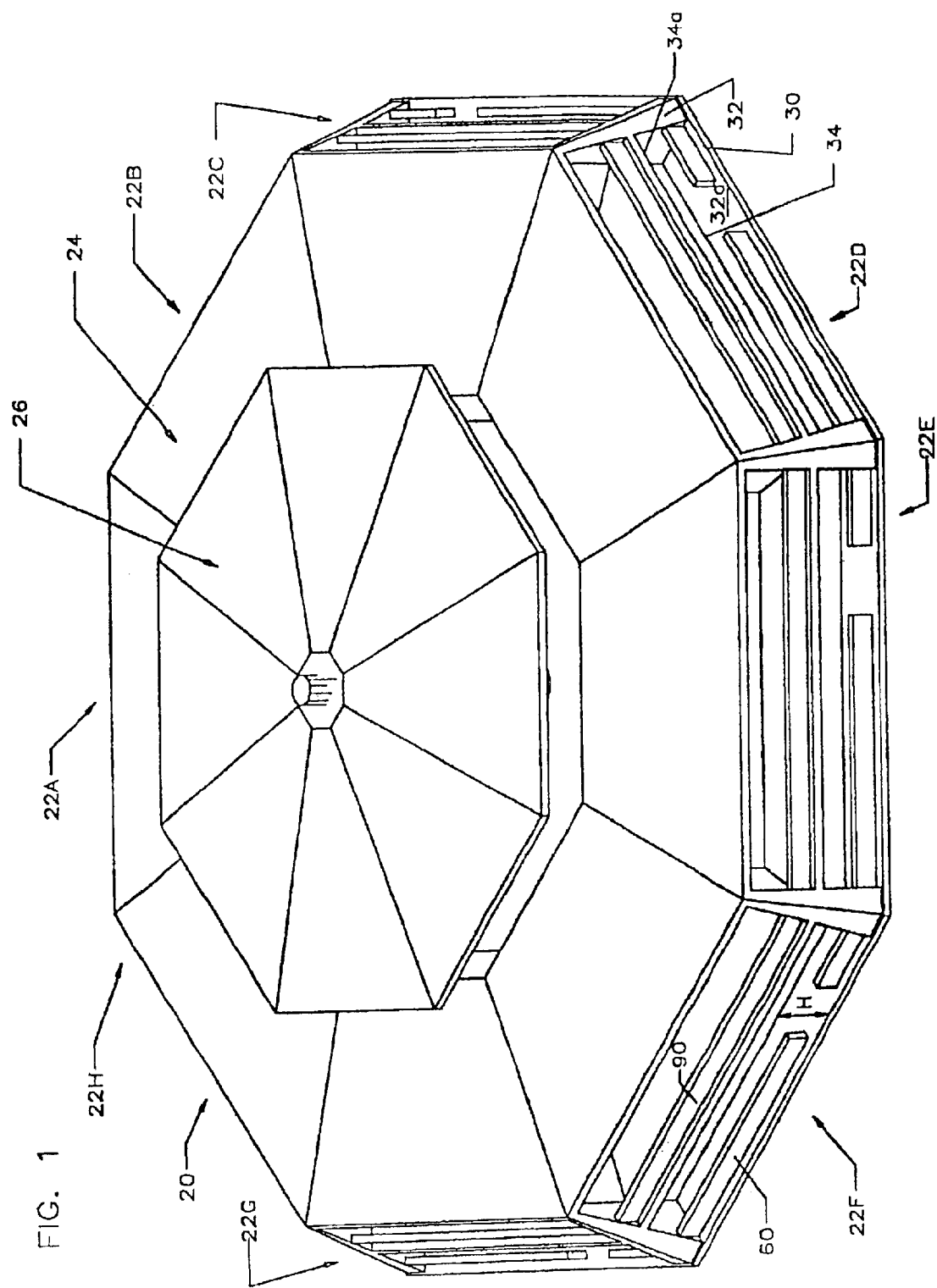
FIG. 1 is an isometric view of a residential structure having an inner roof in an elevated condition.

FIG. 1 shows a structure 20 having a generally octagonal footprint with sectors 22A–22F. The building has a roof with a fixed outer roof portion 24 having eight facets corresponding to the eight sectors and a raisable/lowerable inner roof portion 26 also having eight such facets. In the exemplary embodiment, the outer perimeter of the outer roof portion is recessed slightly relative to the footprint and is coupled to perimeter portions of a foundation slab 30 via tapering pylons 32. In an exemplary structure, the slab 30 provides a first floor and a second floor structure 34 provides a second floor. The first floor having top plane 30a and the second floor having a bottom plane 34a.

Figure 2:
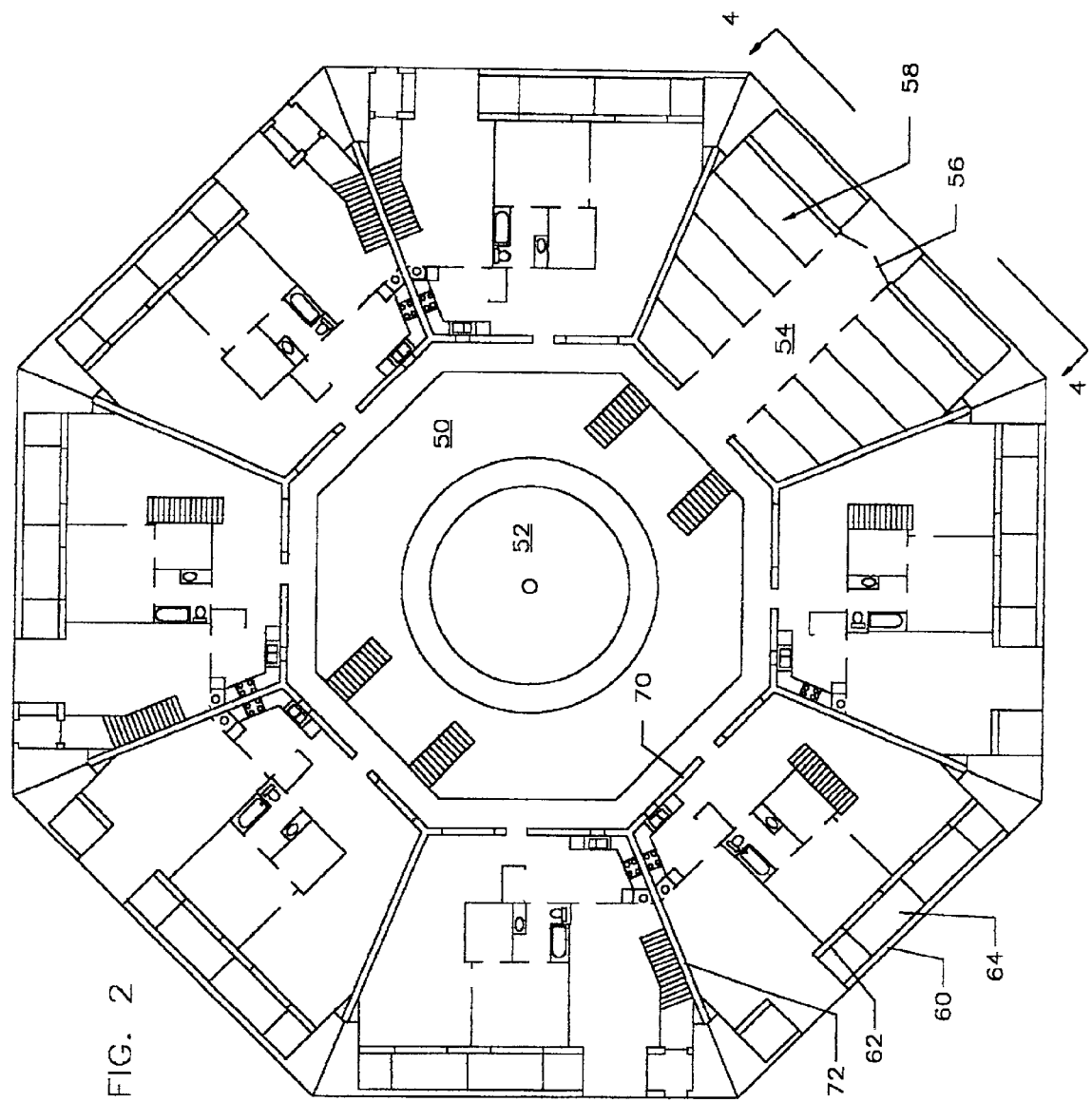
FIG. 2 is a first floor floorplan of the structure of FIG. 1.
Figure 3:
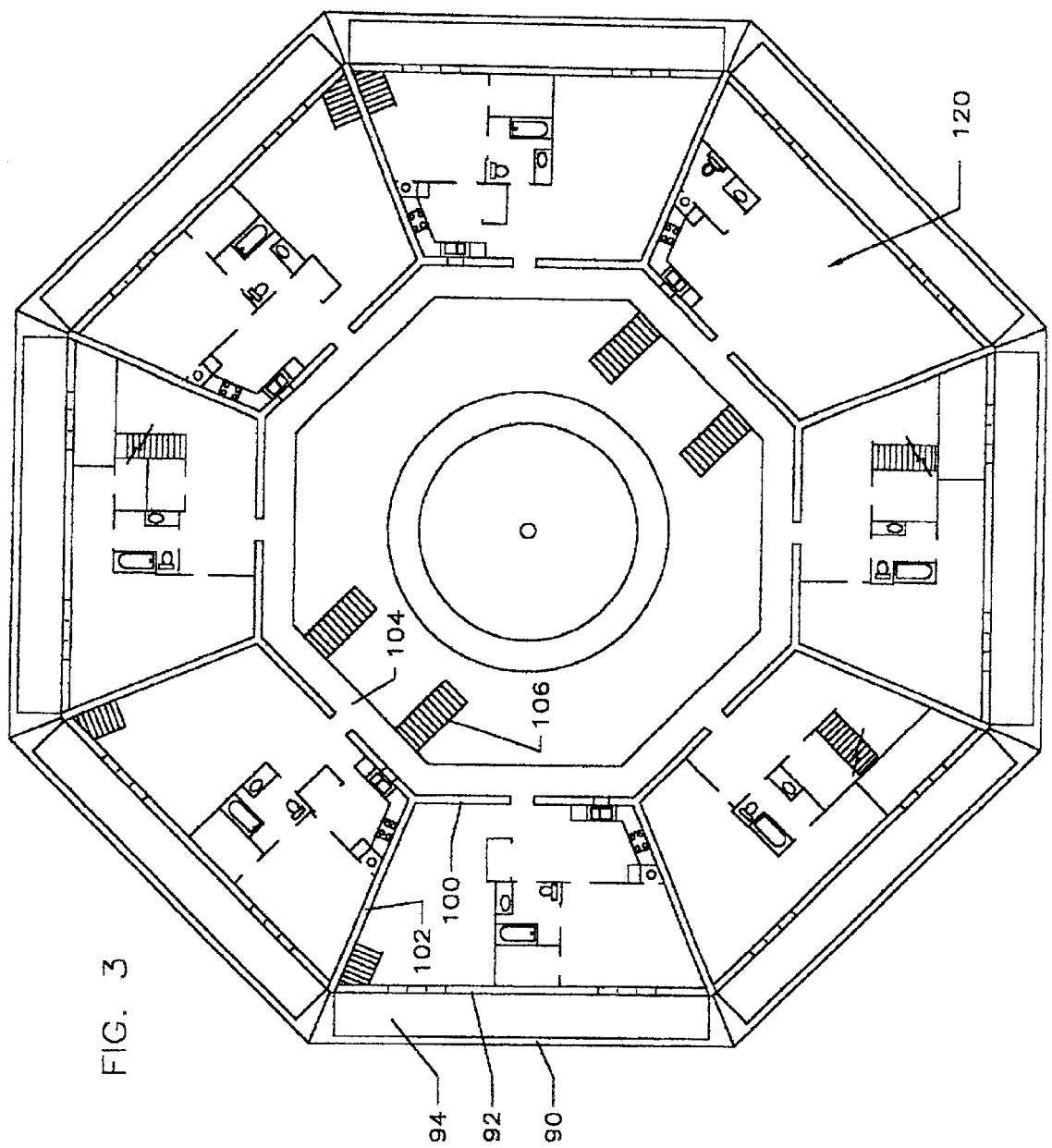
FIG. 3 is a second floor floorplan of the structure of FIG. 1.

Referring to FIGS. 2 and 3, in the exemplary embodiment, the first and second floors surround a central courtyard 50, which may contain an in-ground pool 52. The courtyard may have an octagonal shape complementary to the footprint. In the exemplary embodiment, along seven of the eight sectors are associated individual one-story units or first floors of individual two-story units. Along the remaining sector there may be a common entryway area having a corridor 54 from the perimeter to the courtyard, optionally closed by doors 56 and optionally sided by a plurality of storage areas 58 that may be associated with the individual units. Along the first floor as shown in FIG. 2, each of the exemplary units includes a half wall 60 acting as a railing along the footprint perimeter and a full wall 62 recessed partially radially inward there from to define a front porch or stoop 64 there between. The first floors of the units also include inner walls 70 separating the units from the courtyard and radial walls 72 separating the units/sectors from each other.

As shown in FIG. 3, on the second floor, along each of the sectors is an exterior half wall 90 positioned above the first floor full wall 62 (see FIG. 2) of the first floor and serving as a railing. A full wall 92 is recessed radially inward from both wall 90 and the exterior full wall, i.e., wall 62 to define an open porch or balcony area 94 there between walls 90 and 92. The second floor generally includes a plurality of first inner wall 100 and a plurality of second inner wall 102. First inner wall 100 is typically positioned parallel to and radially inward from wall 92 and two second inner walls 102 are typically positioned between and joined to walls 92 and 100 to form the enclosed area of a particular unit. Walls 100 and 102 are similar to and aligned with associated first floor walls 70 and 72, respectively. The various exterior walls (outer and inner) and the radial walls separating the units are advantageously of reinforced fire resistant construction such as of steel reinforced concrete. Each first inner wall 100 separates the associated unit from a walkway 104 overlooking the courtyard and from which two pairs of stairs 106 extend down to the courtyard 50.

In the second floor sector corresponding to the sector of the first floor corridor 54, there may be a common area 120 such as a recreation or meeting room. The exemplary meeting room may have kitchen and bathroom facilities. Alternatively, this sector may be occupied by a single-story residential unit. Each sector of the second floor may preferably have one or more windows and/or sliding doors opening to its balcony 94 and one or more windows and conventional doors opening to the walkway.

The various first floor units may each include a garage having an associated garage door 130 in the wall 62. One or more additional entry doors 132 or other doors may be provided in such wall as well. The garage doors and such or additional doors may be associated with gaps in the half wall 60.

Figure 4:
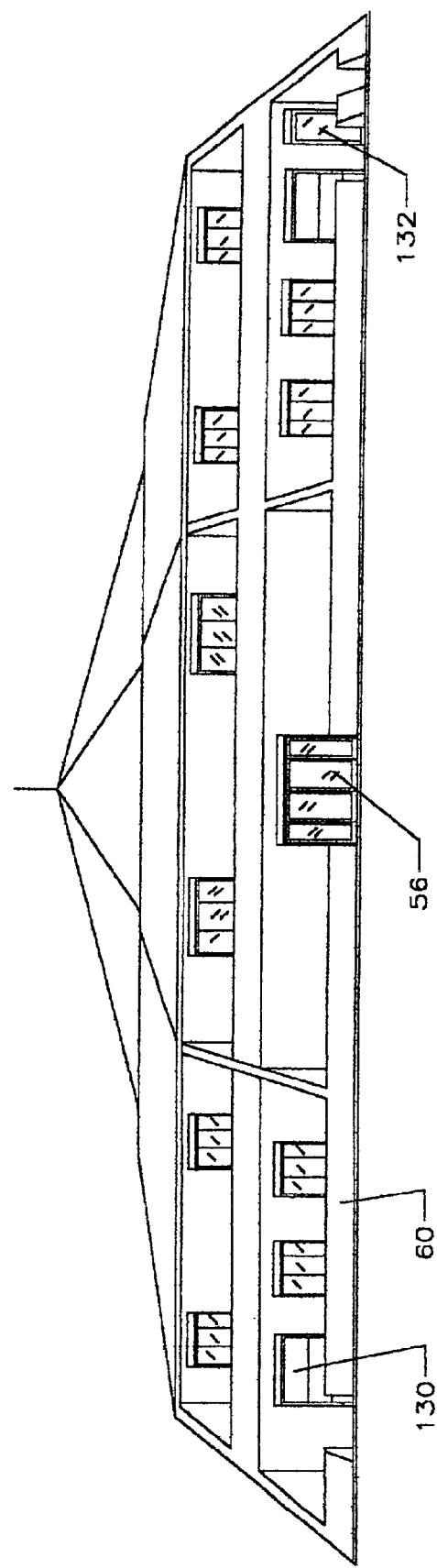
FIG. 4 is a front (main entrance) elevational view of the structure of FIG. 1 with the inner roof lowered and taken along line 4—4 of FIG. 2.
Figure 4A:
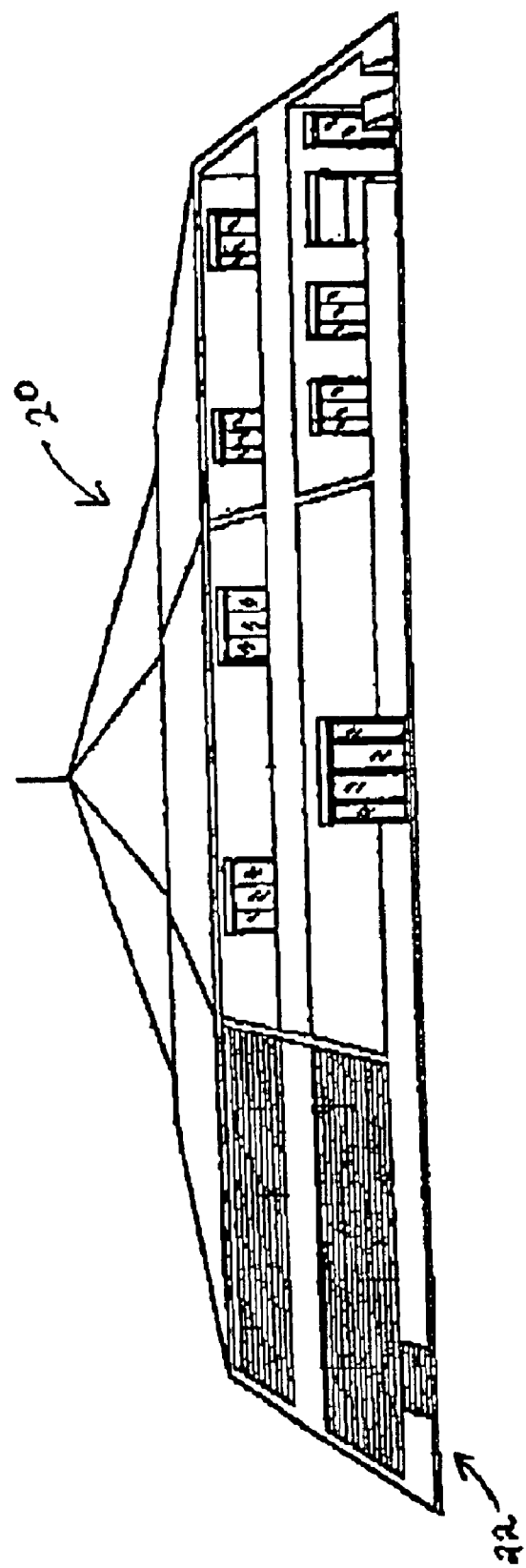
FIG. 4A illustrates deployable covers in a down position on one side of the structure of the elevational view of FIG. 4.
Figure 4B:
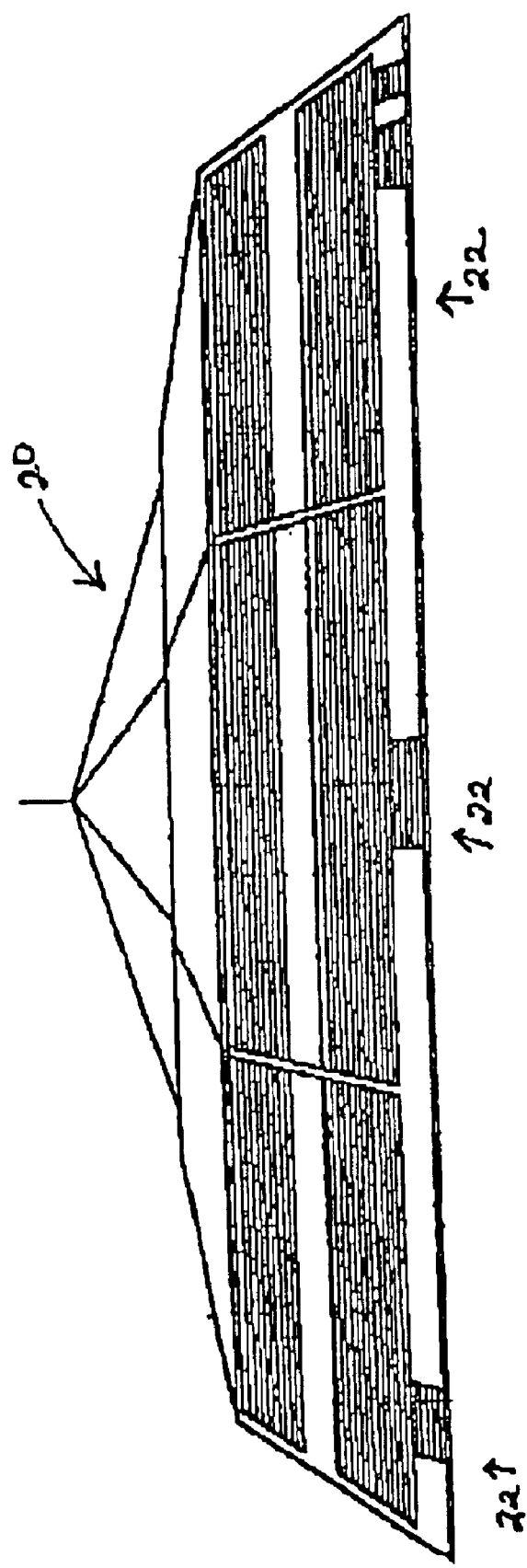
FIG. 4B illustrates deployable covers in a down position on the three sides illustrated of the structure of the elevational view of FIG. 4.

FIG. 2 is a first floor floorplan of the structure of FIG. 1.
FIG. 3 is a second floor floorplan of the structure of FIG. 1.
FIG. 4 is a front (main entrance) elevational view of the structure of FIG. 1 with the inner roof lowered and taken along line 4—4 of FIG. 2. FIG. 4A illustrates deployable covers 258 and 260 (FIG. 16) in a down position on one side 22 of the structure 20 of the elevational view of FIG. 4. FIG. 4B illustrates deployable cover 258 and 260 (FIG. 16) in a down position on the three sides 22 illustrated of the structure 20 of the elevational view of FIG. 4.

Figure 5:
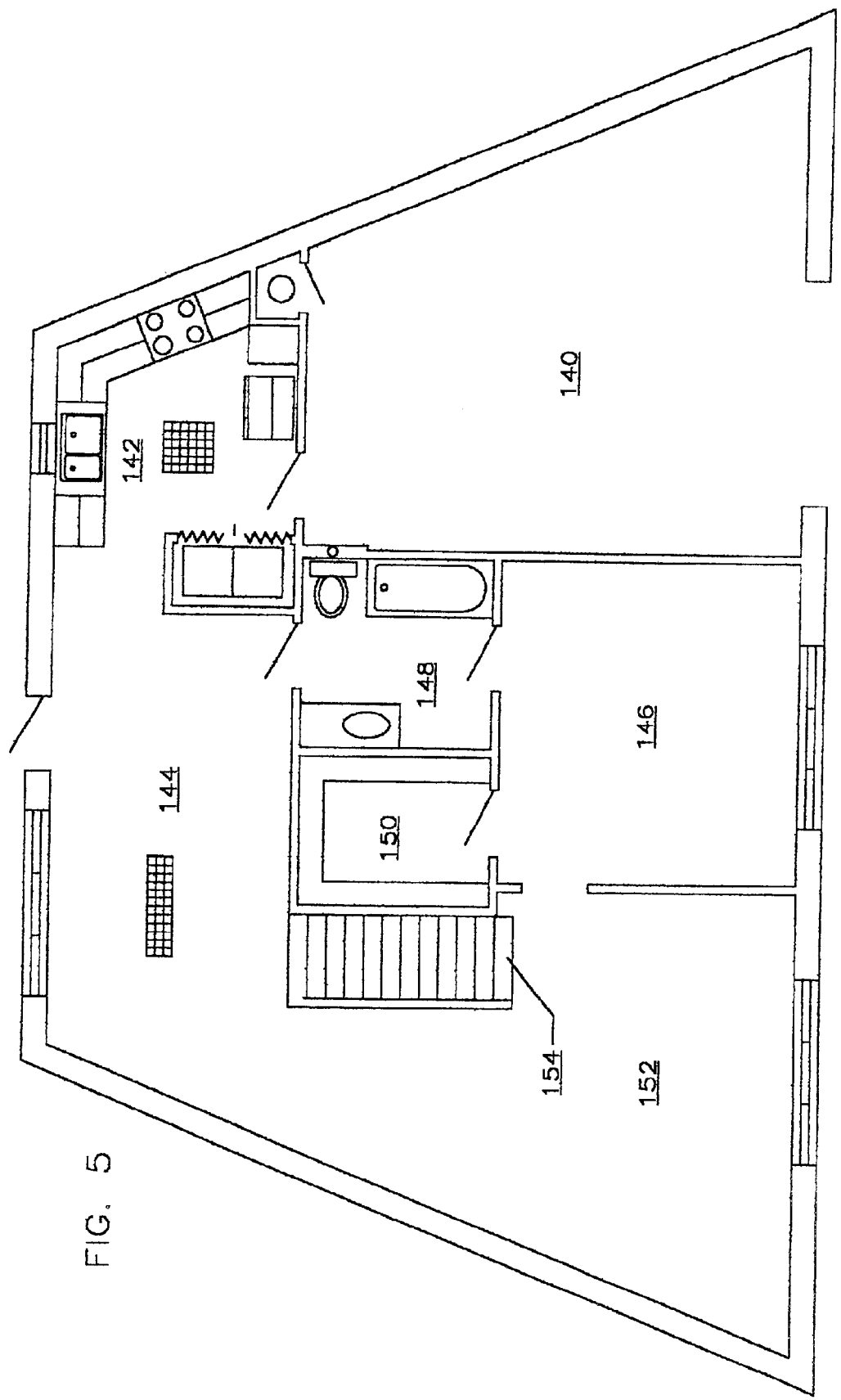
FIG. 5 is a first floor floorplan of a first two-story townhouse unit.

FIG. 5 shows the first floor of a first exemplary two-story townhouse. This floor includes a garage 140 having a door leading to a kitchen 142 which is next to a dining area 144.

Next to the garage, centrally along the front (outward edge) of the unit is a bedroom 146. Between the bedroom and dining room are a side-by-side bathroom 148 and walk-in closet 150. Advantageously, for additional safety, the walls of one or both of the bathroom and closet are reinforced so as to create a safe room for occupancy in the event of a hurricane. Such reinforcement is, advantageously, of steel-reinforced concrete leaving the wall substantially stronger than the other walls within the individual units. A door or doors (not shown) to this safe room (not shown) may also advantageously be relatively robust (e.g., a steel fire door). On the opposite side of the bedroom 146 from the garage 140 is a living room 152 from which a staircase 154 ascends.

Figure 6:
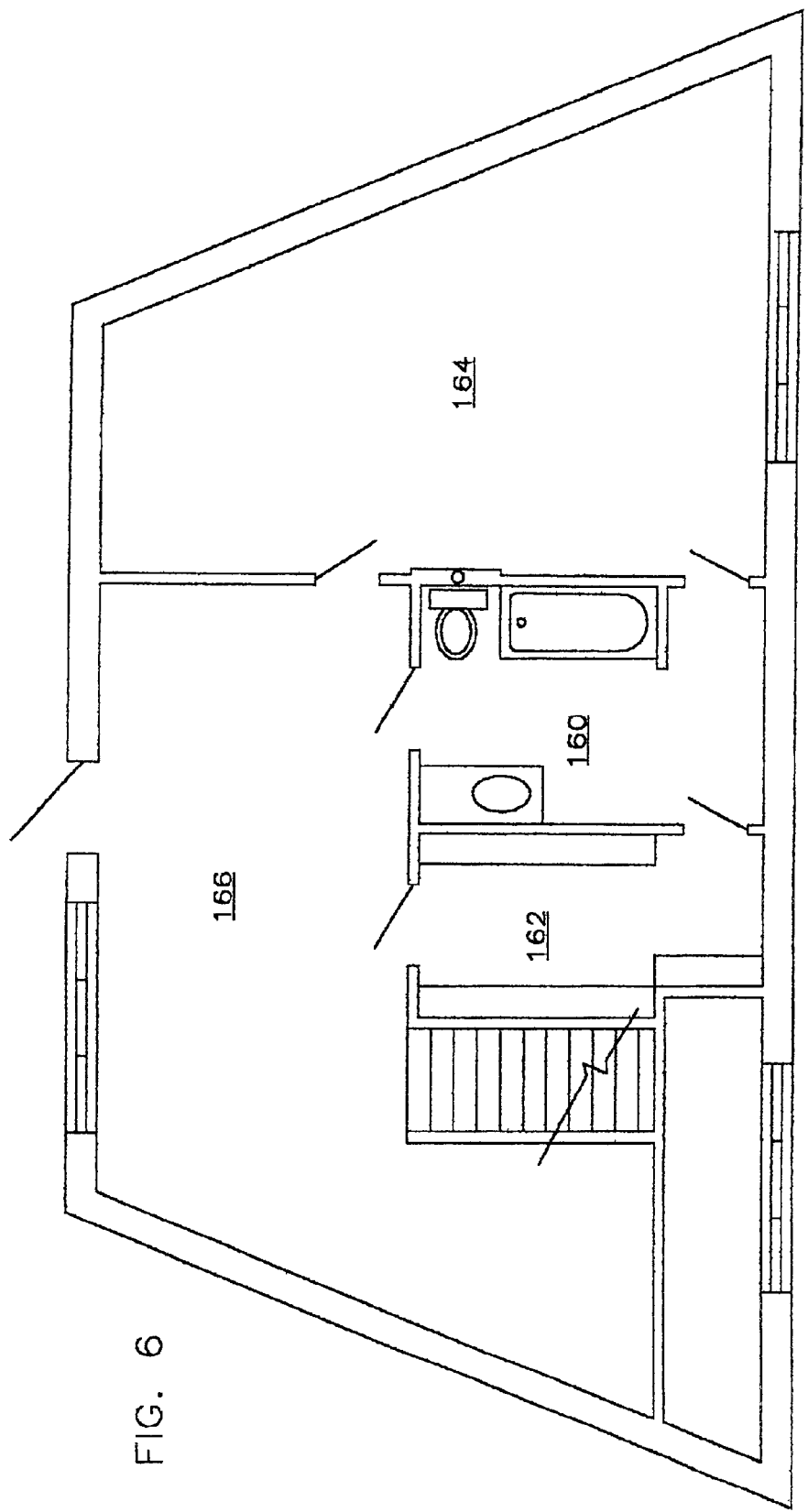
FIG. 6 is a second floor floorplan of the unit of FIG. 5.

FIG. 6 shows the second floor of the townhouse of FIG. 5. A bathroom 160 and closet 162 are advantageously directly above their first floor counterparts. A first bedroom 164 is located above the kitchen and inboard portion of the garage. A family room 166 is located above the dining room and inboard portion of the living room. One or more doors and/or windows (not shown) may be provided along the interior courtyard walkway.

Figure 7:
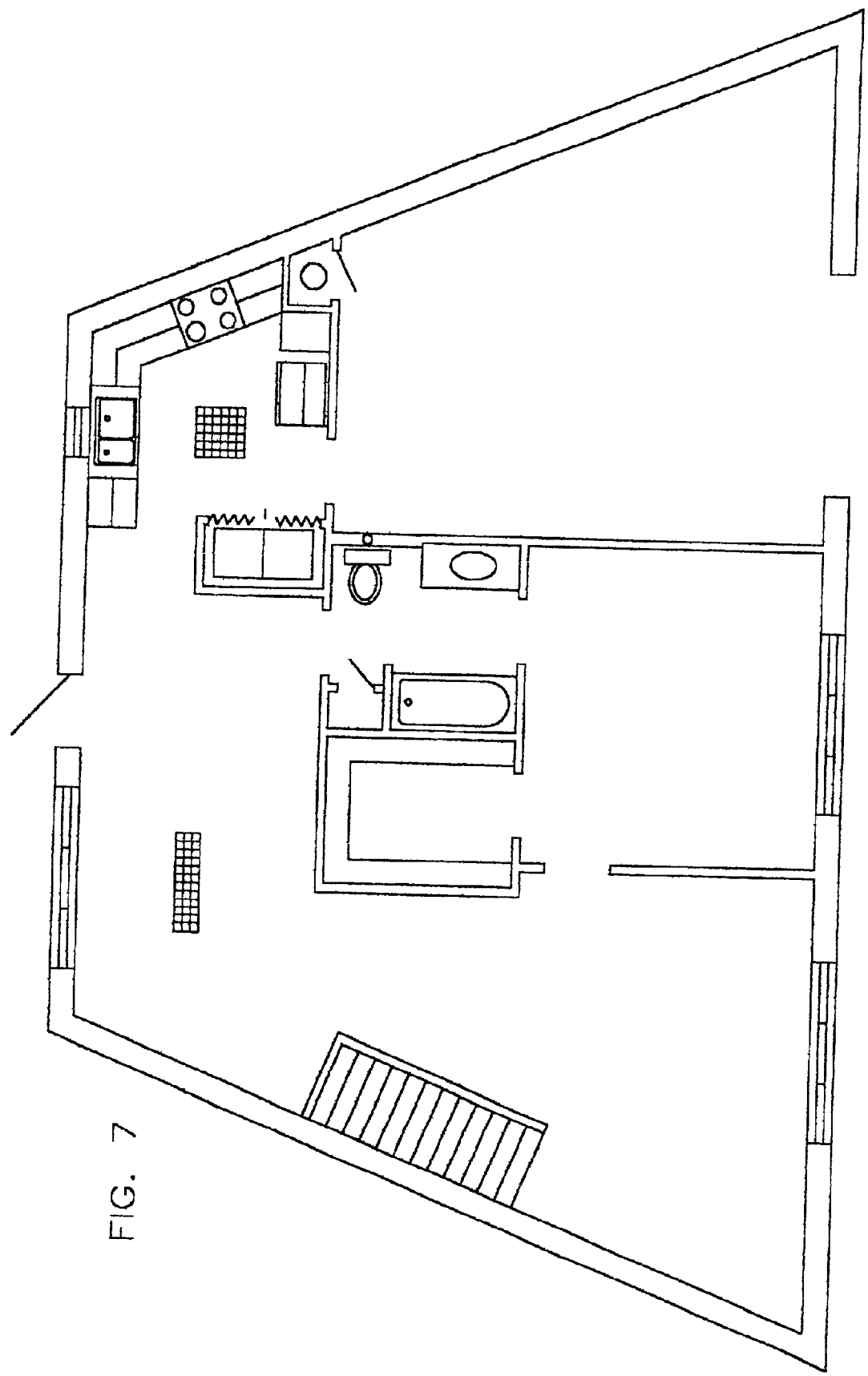
FIG. 7 is a first floor floorplan of a second two-story townhouse unit.
Figure 8:
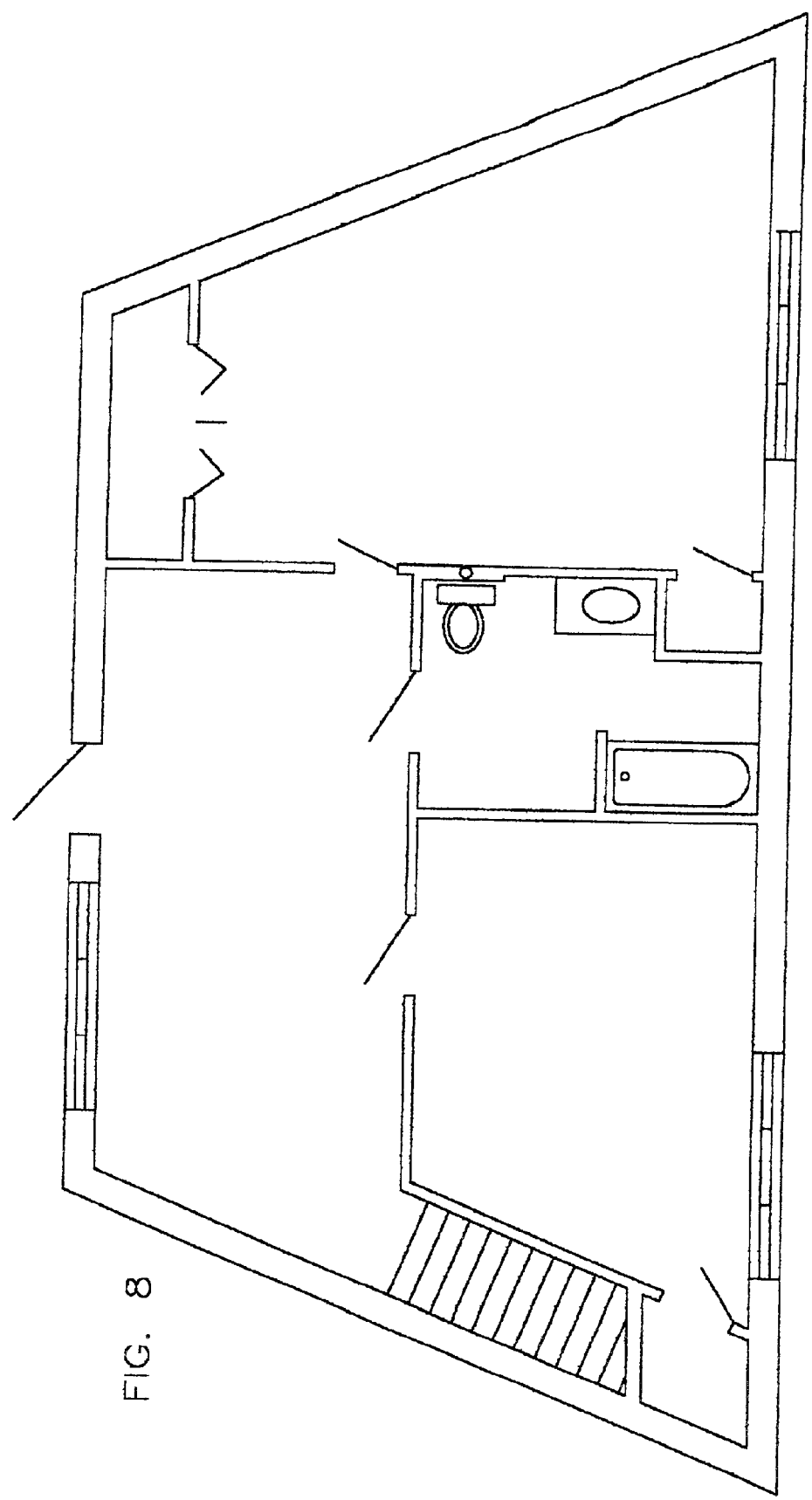
FIG. 8 is a second floor floorplan of the unit of FIG. 7.

FIGS. 7 and 8 show the first and second floors of a second exemplary townhouse.

Figure 9:
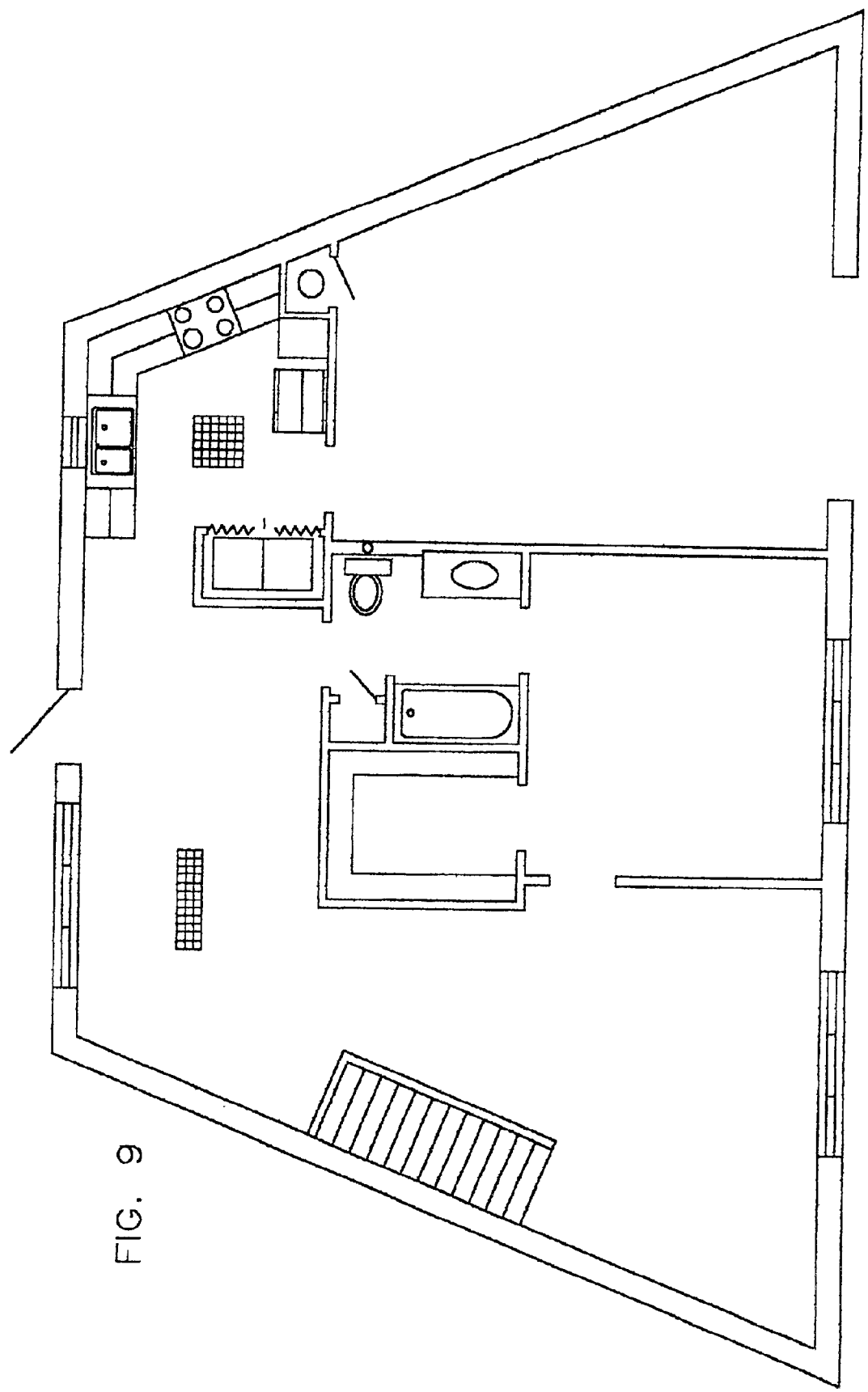
FIG. 9 is a first floor floorplan of a third two-story townhouse unit.
Figure 10:
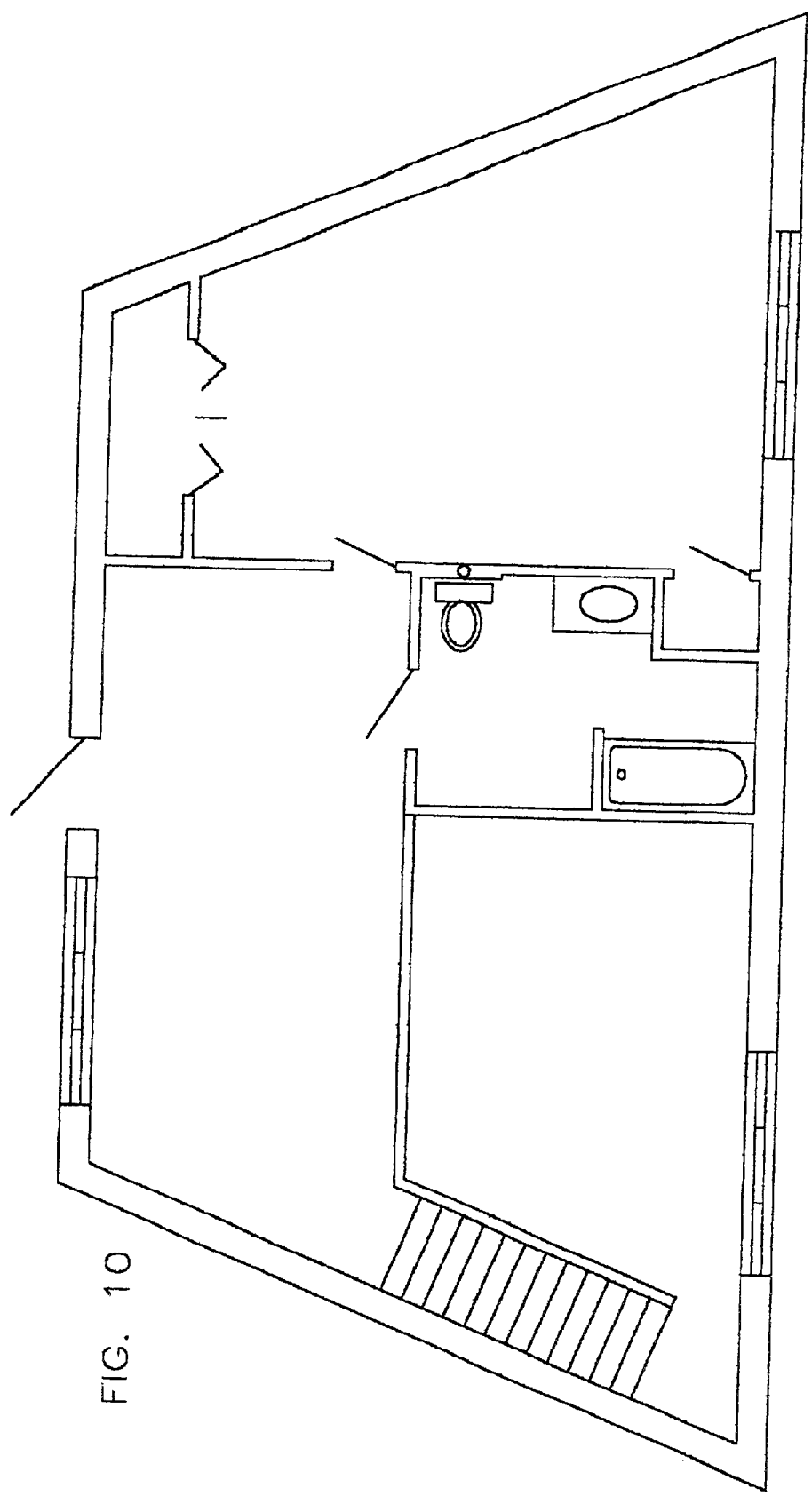
FIG. 10 is a second floor floorplan of the unit of FIG. 9.

FIGS. 9 and 10 show the first and second floors of a third exemplary townhouse.

Figure 11:
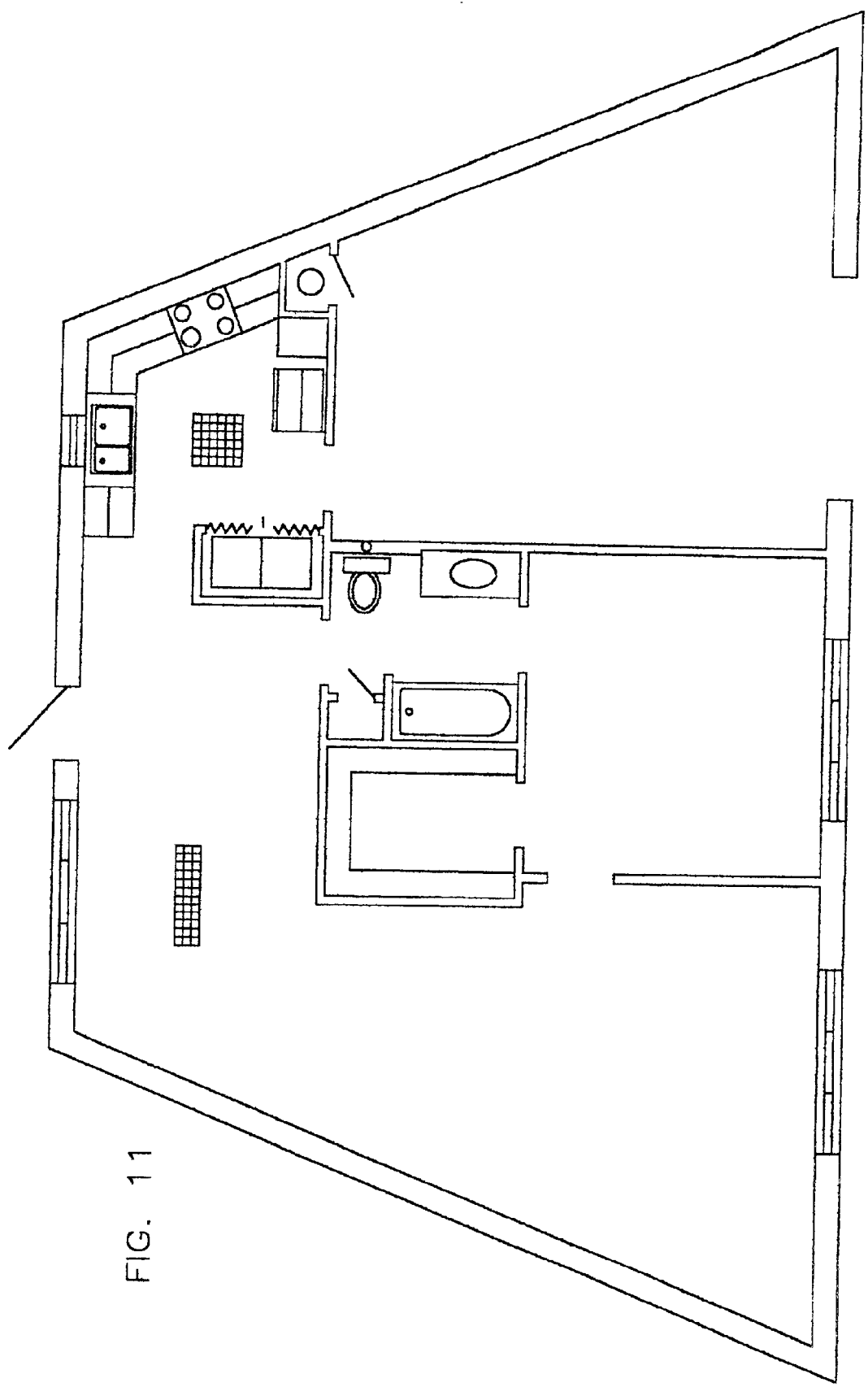
FIG. 11 is a floorplan of an exemplary first floor unit.

FIG. 11 shows a first floor single-story unit which is generally similar to the first floor of the townhouse of FIG. 5.

Figure 12:
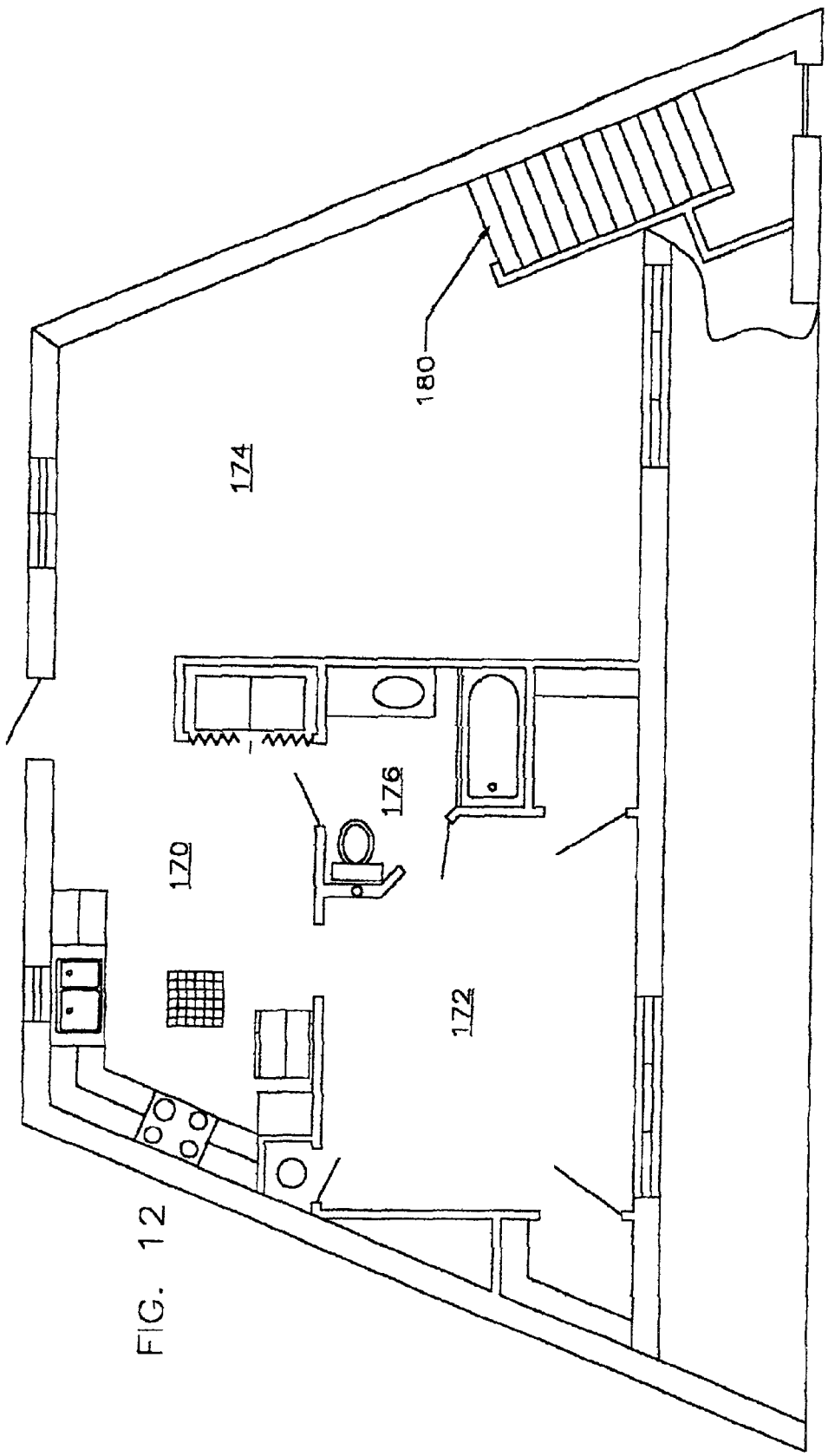
FIG. 12 is a floorplan of an exemplary second floor unit.

FIG. 12 shows an exemplary second floor single-story unit having a kitchen/dining area 170 along one inboard side, a bedroom 172 outboard along the same side, and a living/family room 174 along the opposite side, with a bathroom 176 centrally located. One door to the unit may be to the second story walkway whereas an exit staircase 180 may be provided to the perimeter of the first floor.

Figure 13:
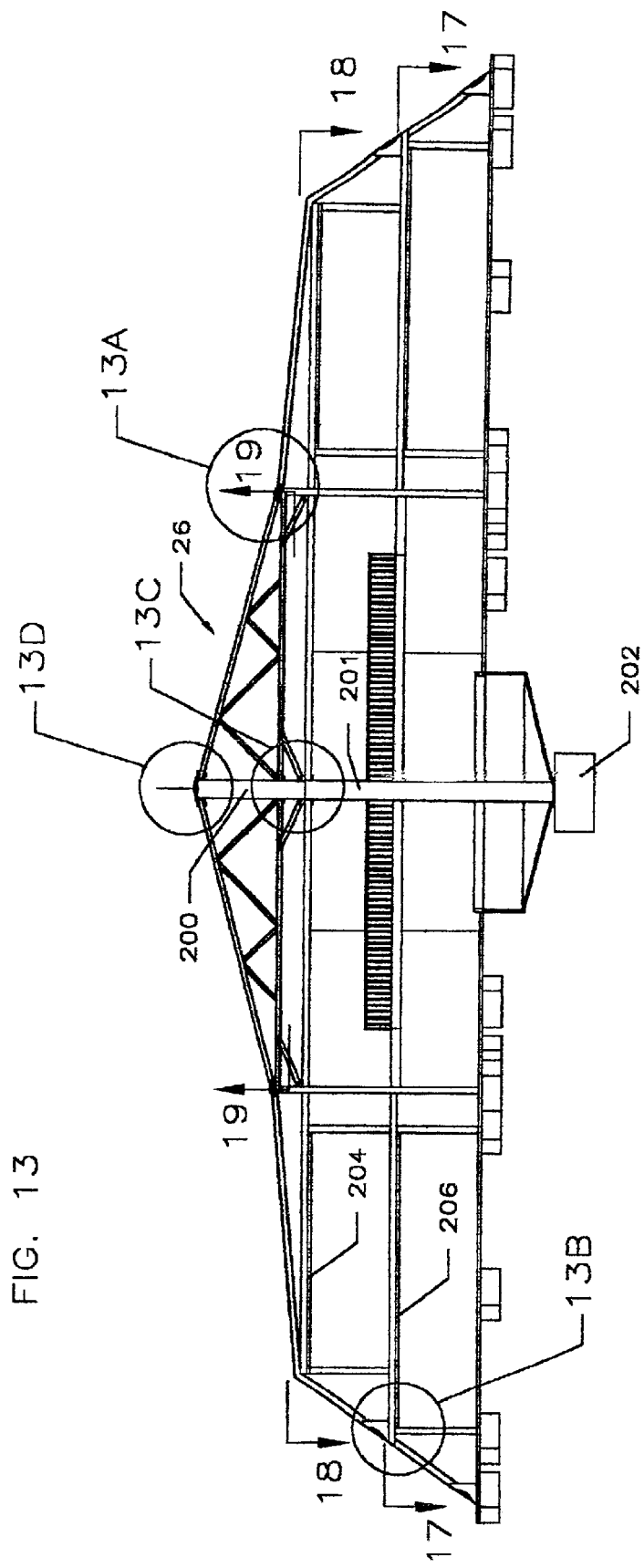
FIG. 13 is a transverse schematic sectional view of the structure of FIG. 1 with the inner roof in a lowered condition.
Figure 13A:
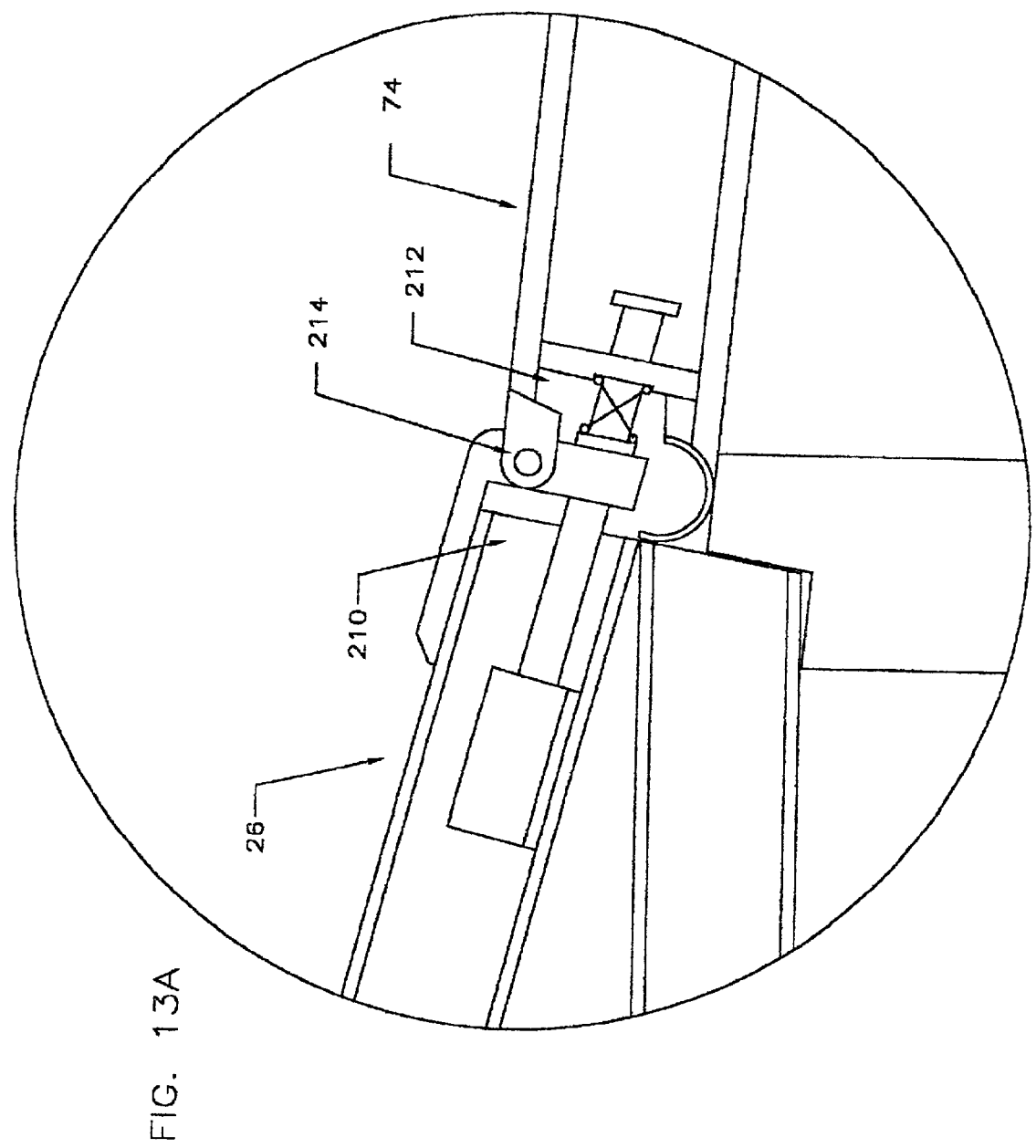
FIG. 13A is a view of a locking mechanism on the roof of the structure of FIG. 13.

FIG. 13 shows the inner roof portion 26 being supported by a central pole or mast 200 within a sleeve 201 extending upward from a hydraulic support actuator 202 located beneath the pool. The figure also shows various structural and foundation components including radially extending steel I-beams 204 of the second story ceiling and 206 of the second story floor/first story ceiling. FIG. 13A shows the inner roof 26 locked to the outer roof 24 along their respective outer and inner peripheries 210 and 212. Along each facet of the roof, there may be one or more locking or latching mechanisms 214 which secure the two roof portions and provide a hurricane-resistant connection therebetween.

Figure 13B:
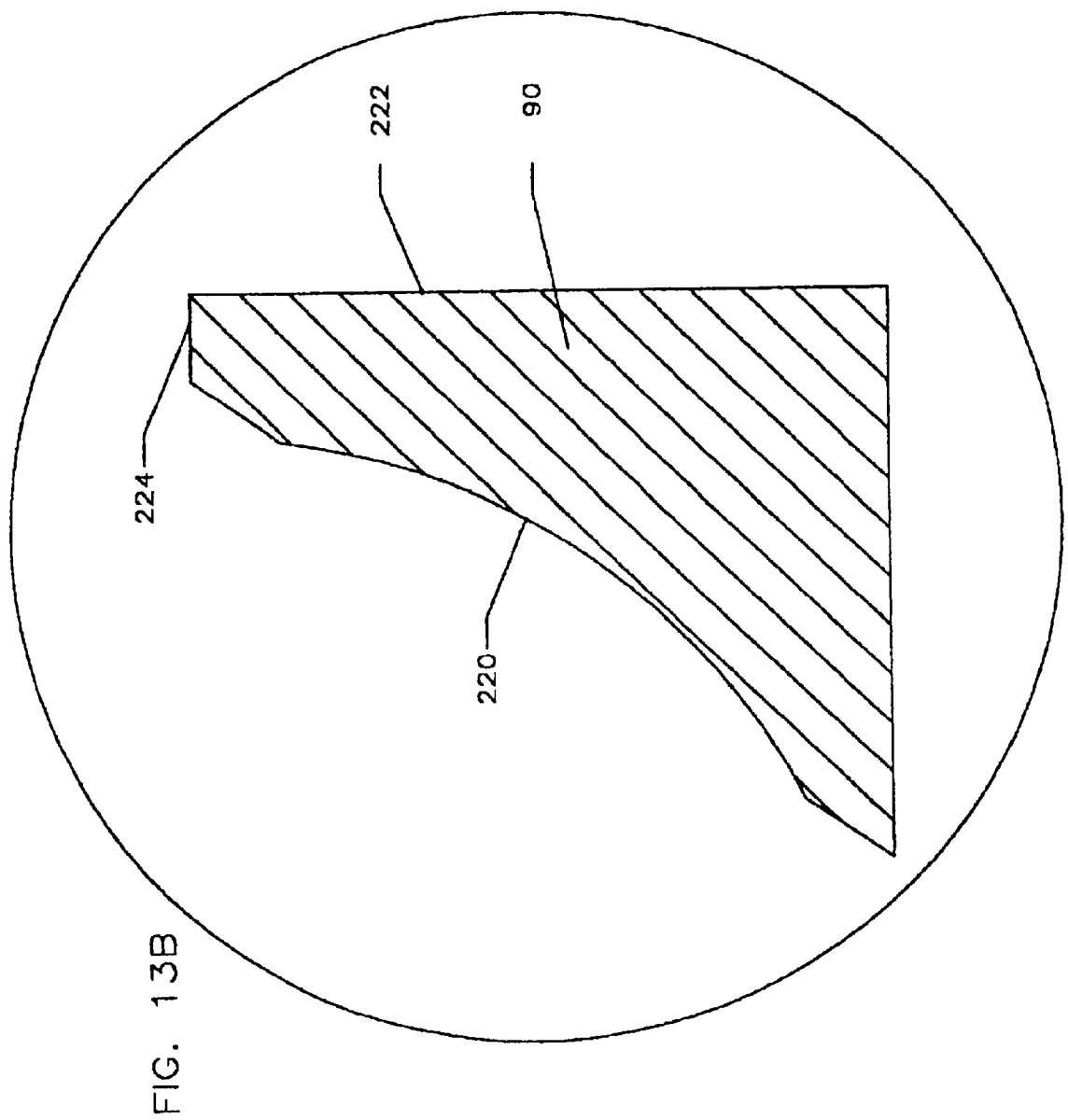
FIG. 13B is a transverse sectional view of a half-wall on the structure of FIG. 13.

FIG. 13B shows a cross section of the half wall 90 (half wall 60 having a similar section). The exemplary half wall has a sloped concave arcuate outer surface 220 and a vertical inner surface 222 with a top railing surface 224. The overall slope of the surface 220 is advantageously between about 20° and 50° off vertical. The half wall is advantageously highly robust, such as of reinforced concrete or other cementaceous product. The slope and concavity along with material strength help deflect wind and flying debris in the event of a hurricane. The reinforced concrete wall 90 can extend a height of between 1½ and 5 feet and have a concave arcuate outer profile, i.e., as defined by surface 220, and occupy a sector of the footprint along an associated side of each unit. Each inner wall or full wall 92 separates a central common area from a number of outer individual residential units, each such unit occupying a sector of the footprint along an associated side thereof.

Figure 13C:
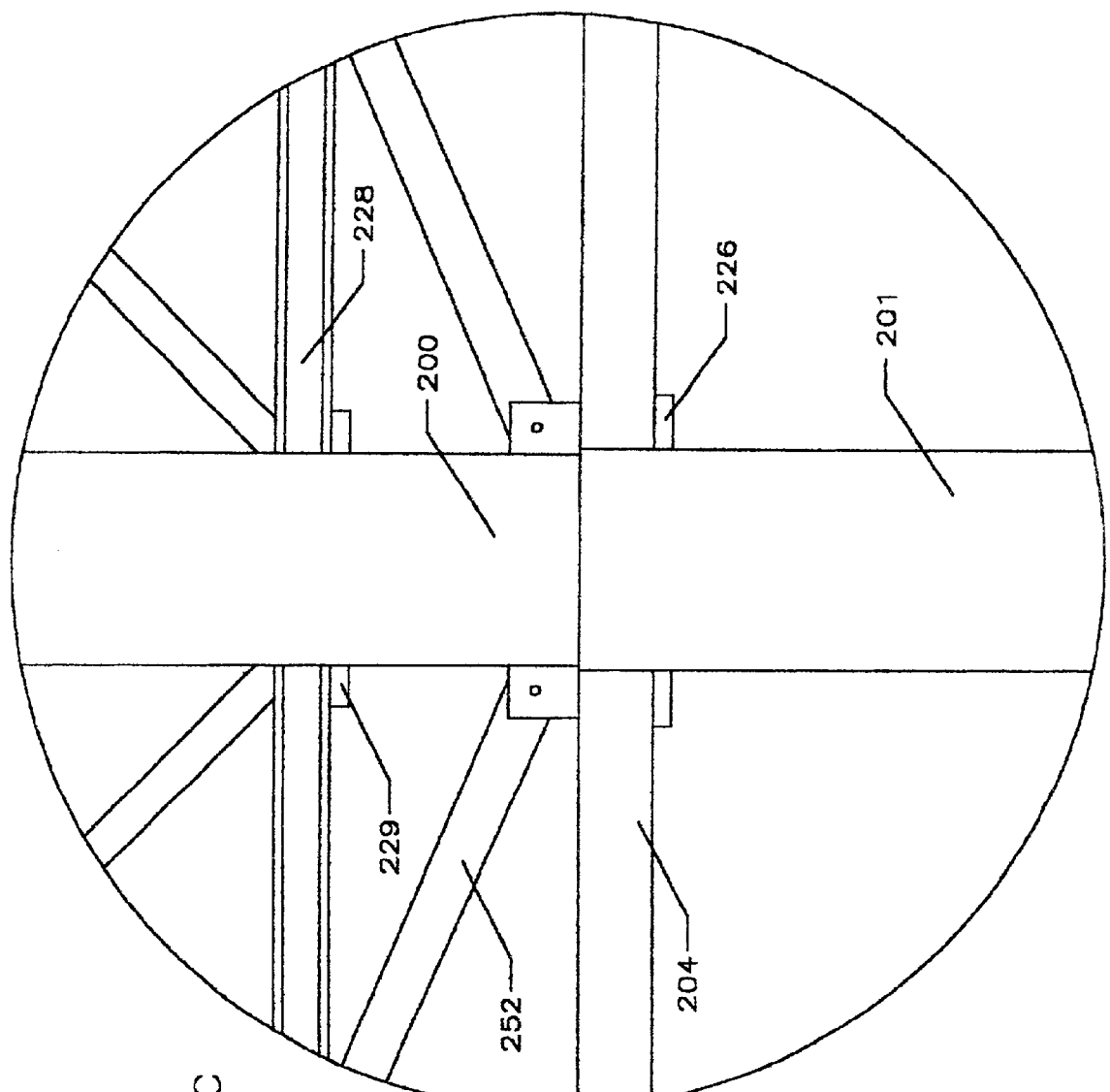
FIG. 13C is an enlarged view of a lower central portion if the inner roof of the structure of FIG. 13.
Figure 13D:
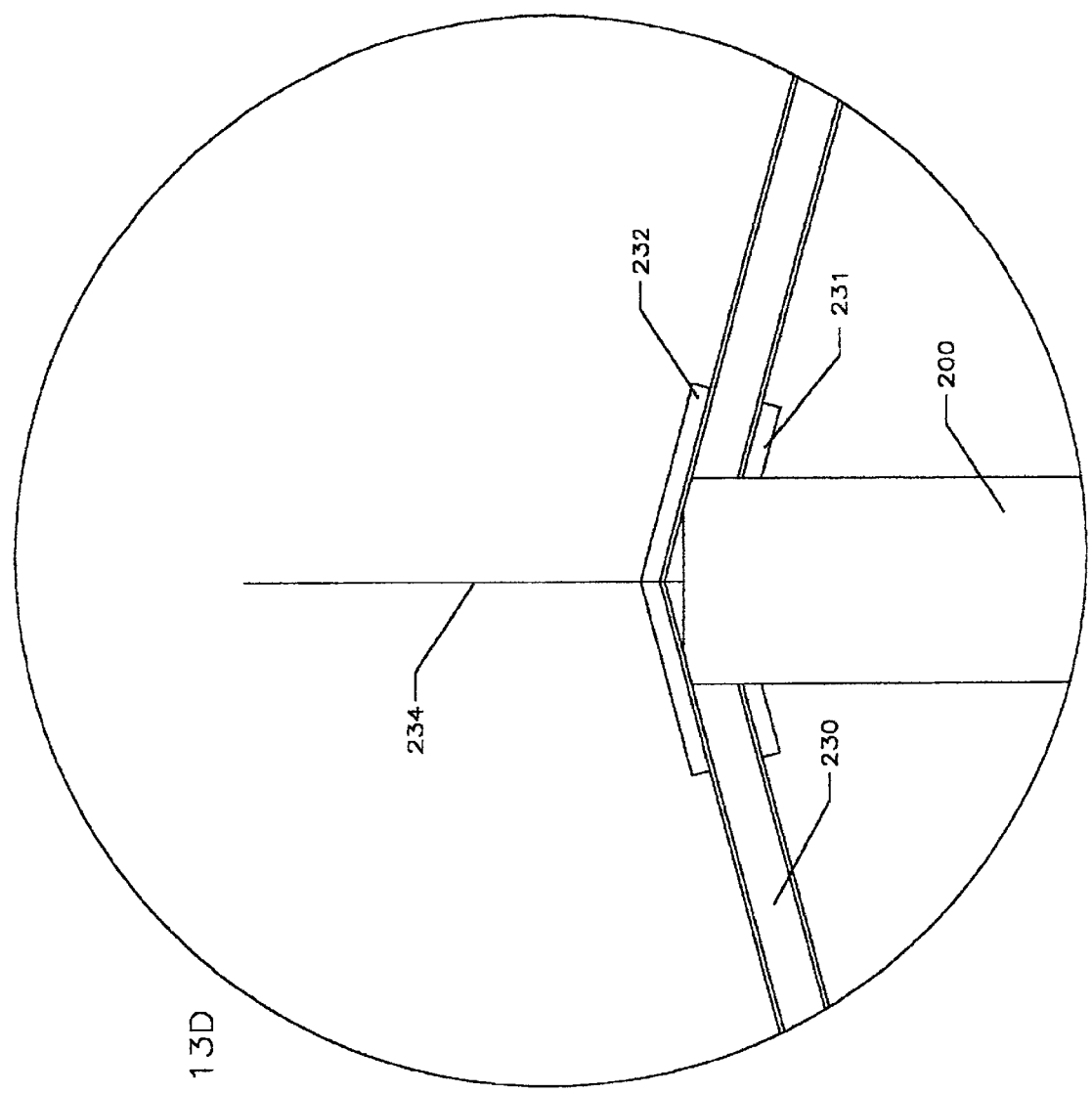
FIG. 13D is an enlarged view of an upper central portion if the inner roof of the structure of FIG. 13.

With the locking mechanisms 214 disengaged, the mast 200 may be raised to elevate the inner roof portion. FIG. 13C shows the mast 200 freely passing through the sleeve 201, the upper end portion of which is within a structural ring 226 from which the beams 204 radiate. The figure also shows aluminum I-beams 228 of the inner roof radiating from a central support ring 229 secured to the mast. FIG. 13D shows aluminum I-Beams 230 for supporting the inner roof skin (not shown) and radiating from a support plate 231 and top cap element 232 at the top of the mast. A lightning rod 234 is shown extending up from the cap.

Figure 14:
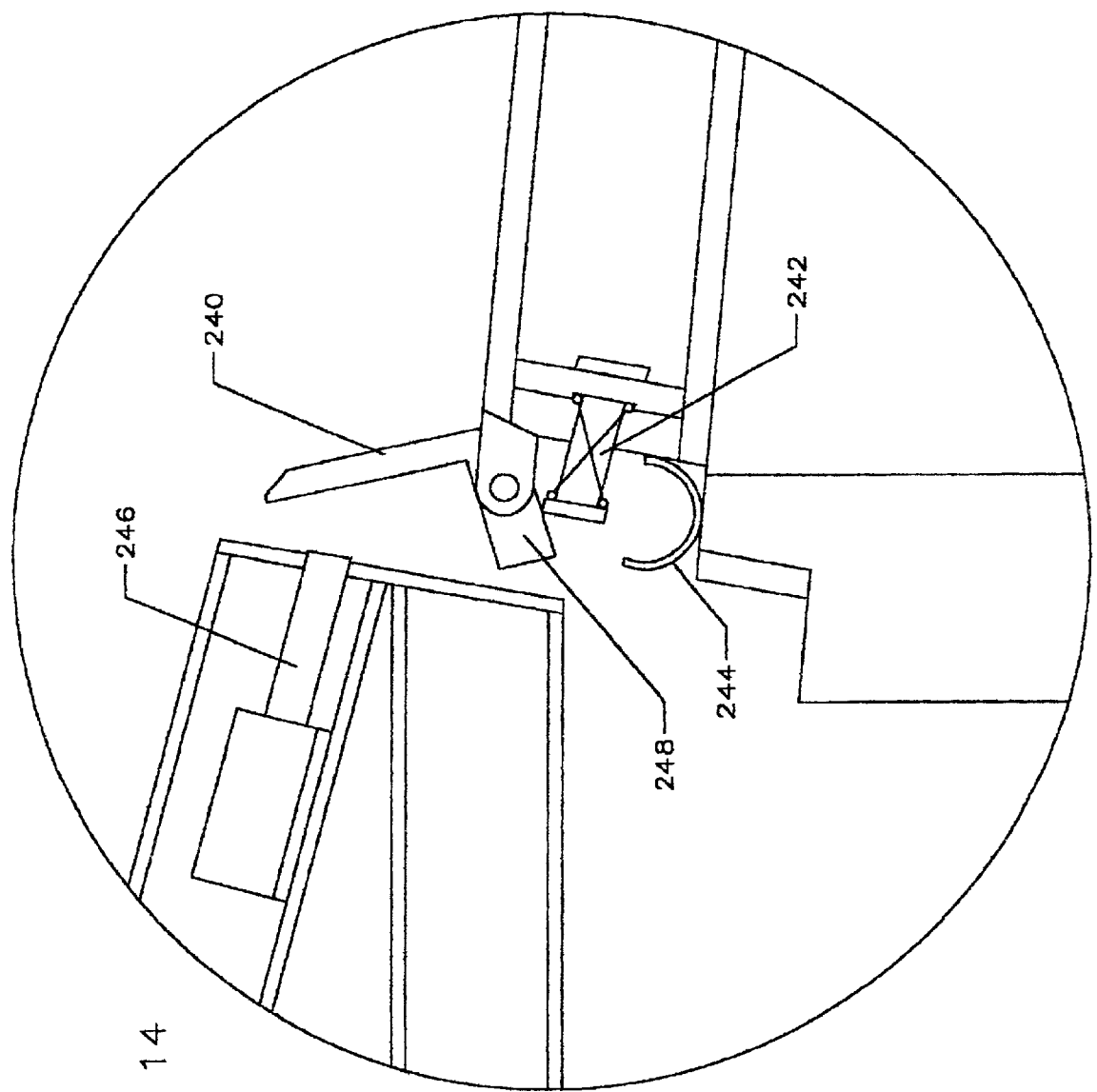
FIG. 14 is a view of the locking mechanism of FIG. 13A with the inner roof in a partially elevated condition.

FIG. 14 shows the inner roof portion being initially raised with a cover member 240 at the inner edge of the outer roof portion being pivoted out of engagement with the outer edge of the inner roof portion via a spring mechanism 242 above a gutter/seal 244. This is permitted via the retraction/release of a locking actuator 246 carried by the inner roof portion and which has heretofore engaged the lower inboard surface of a lower lever arm portion 248 of the cover 240 opposite an outboard surface that engages the spring 242.

Figure 15:
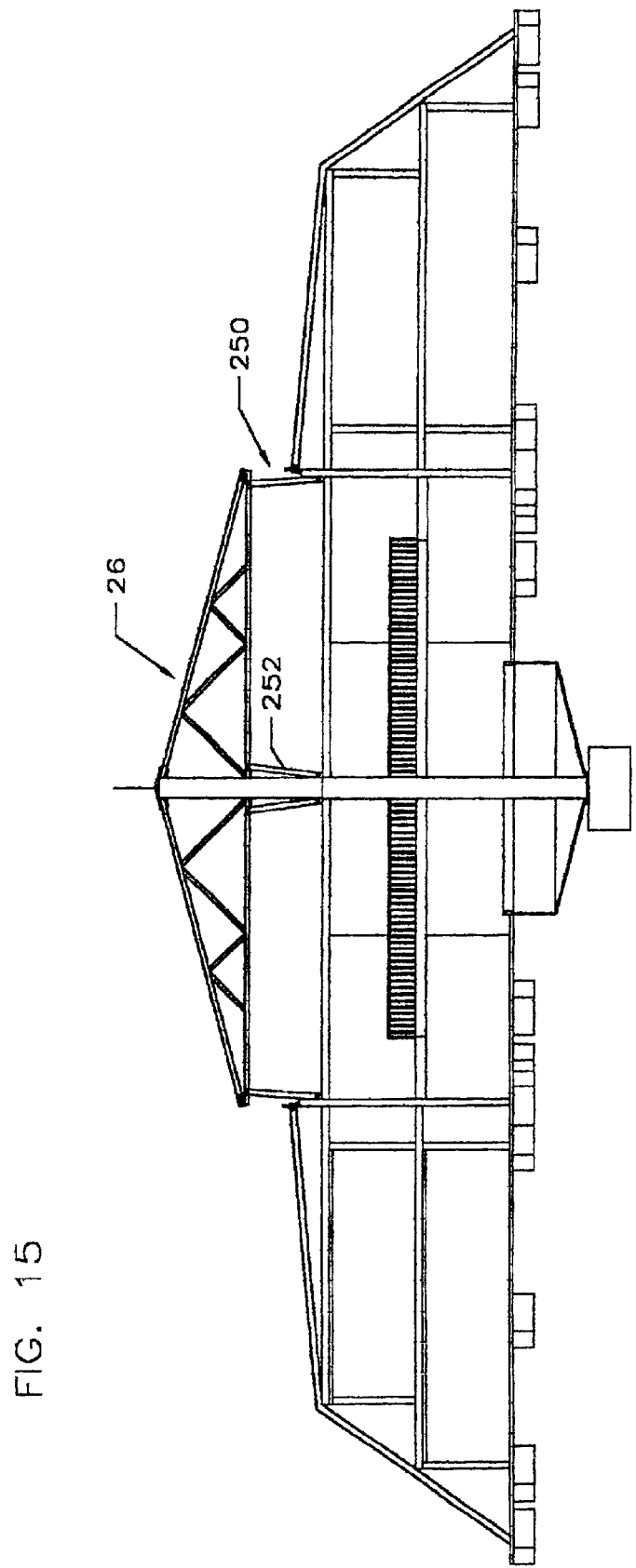
FIG. 15 is a transverse schematic sectional view of the structure of FIG. 1 with the inner roof in the elevated condition.

FIG. 15 shows the inner roof portion 26 in its fully elevated condition providing a 360° vertical gap 250 between its outer edge and the inner edge of the outer roof. Stable raising and lowering of the roof may be guided by a series of sliding links 252 (e.g. aluminum box channel having one end pivotally secured to an associated I-beam 204 and another end sliding along an associated I-beam 228). The normal roof condition may be the raised condition. In the event of a hurricane, the roof may be lowered and locked in place via the locking mechanisms. The locking mechanisms are advantageously sufficiently robust to maintain engagement of the inner and outer roof portions during a hurricane.

Figure 16:
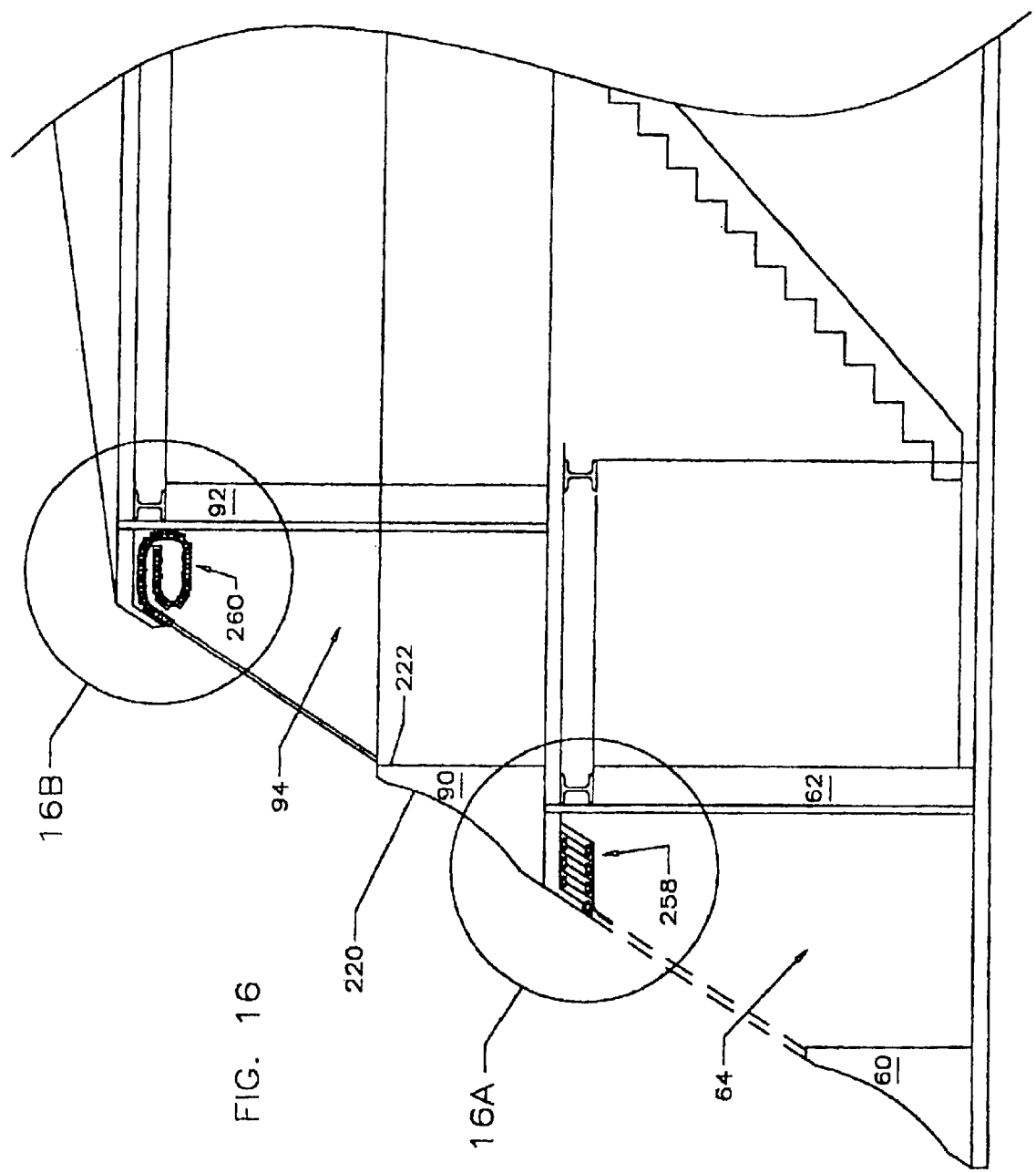
FIG. 16 is a schematic sectional view of an outer perimeter portion of the structure of FIG. 1 showing shields in a stowed or retracted condition.
Figure 16A:
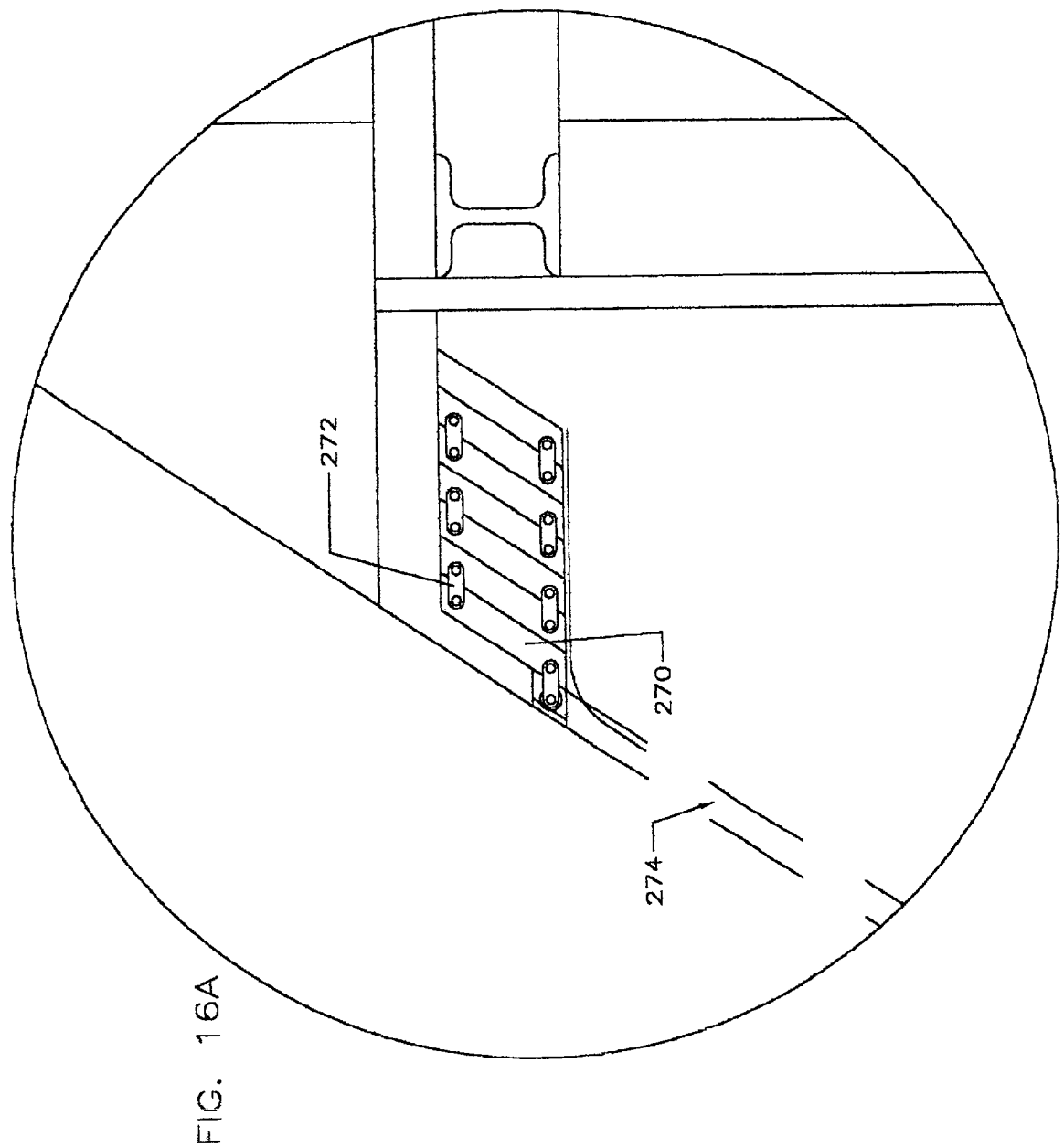
FIG. 16A is an enlarged view of one shield of FIG. 16.
Figure 16B:
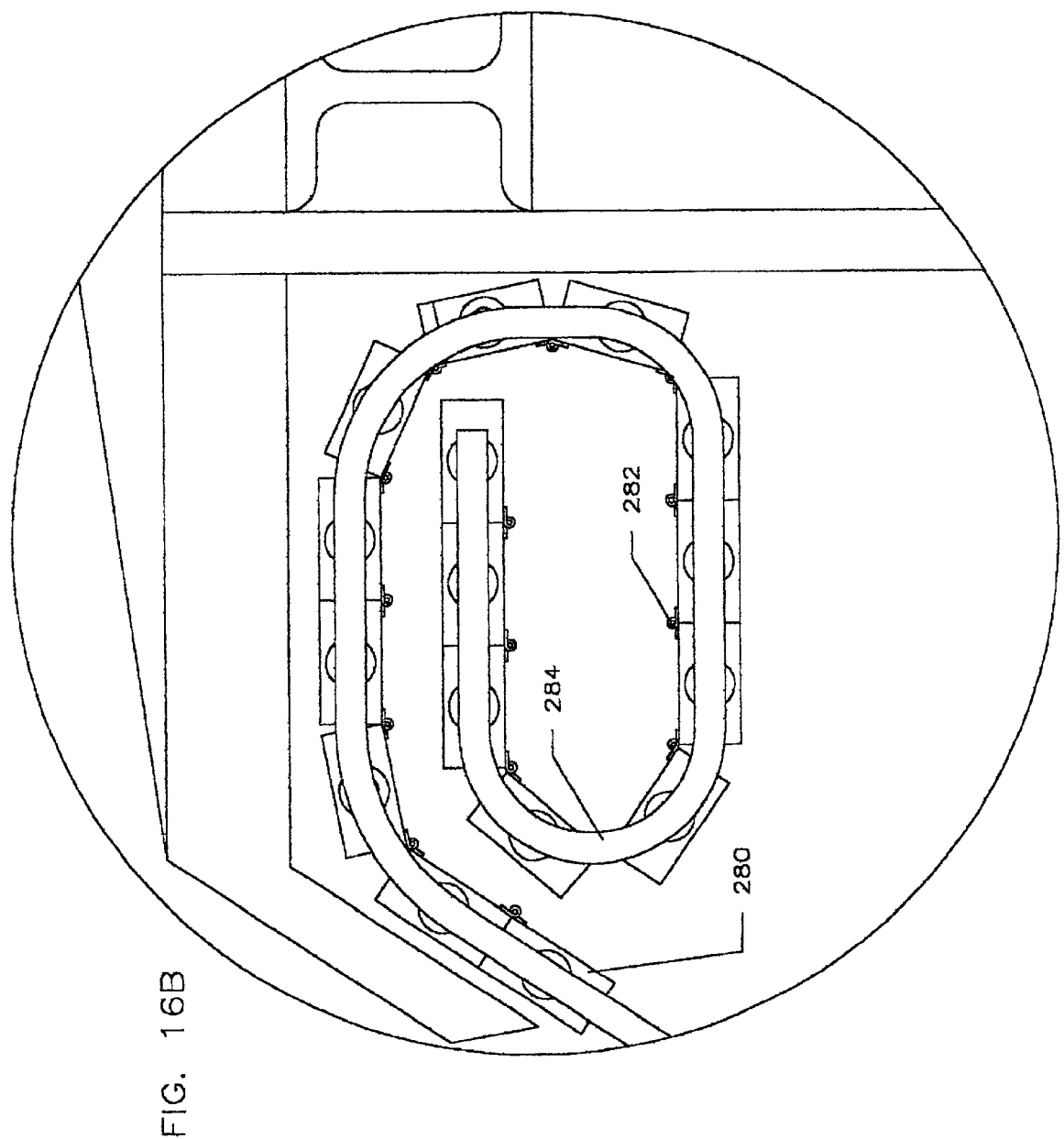
FIG. 16B is an enlarged view of another shield of FIG. 16.

As an additional safety measure, the areas 64 and 94 may be provided with retractable and deployable covers 258 and 260 (FIG. 16). FIG. 16A shows one implementation of a cover in which a plurality of corrugated shield elements or panels 270 are coupled to each other via staggered hinge links 272. In its retracted or stowed condition, the panels 270 are accordioned flat against each other. Advantageously, in this condition, the panels are concealed in a compartment beneath the second story floor or the roof, respectively. The panels may be deployed down a track 274 along the associated side face of the building.). There may be multiple covers side by side along each side of the building and the covers may be manually deployed (e.g., via a hand crank or a tether) or may be motorized (e.g., via electric motor). The covers are advantageously sufficiently robust to resist hurricane winds and debris impacts. FIG. 16B shows an alternate cover in which blocks 280 are hinged to each other via hinges 282 and which have end-rollers (not shown) riding along a track 284.

Figure 17:
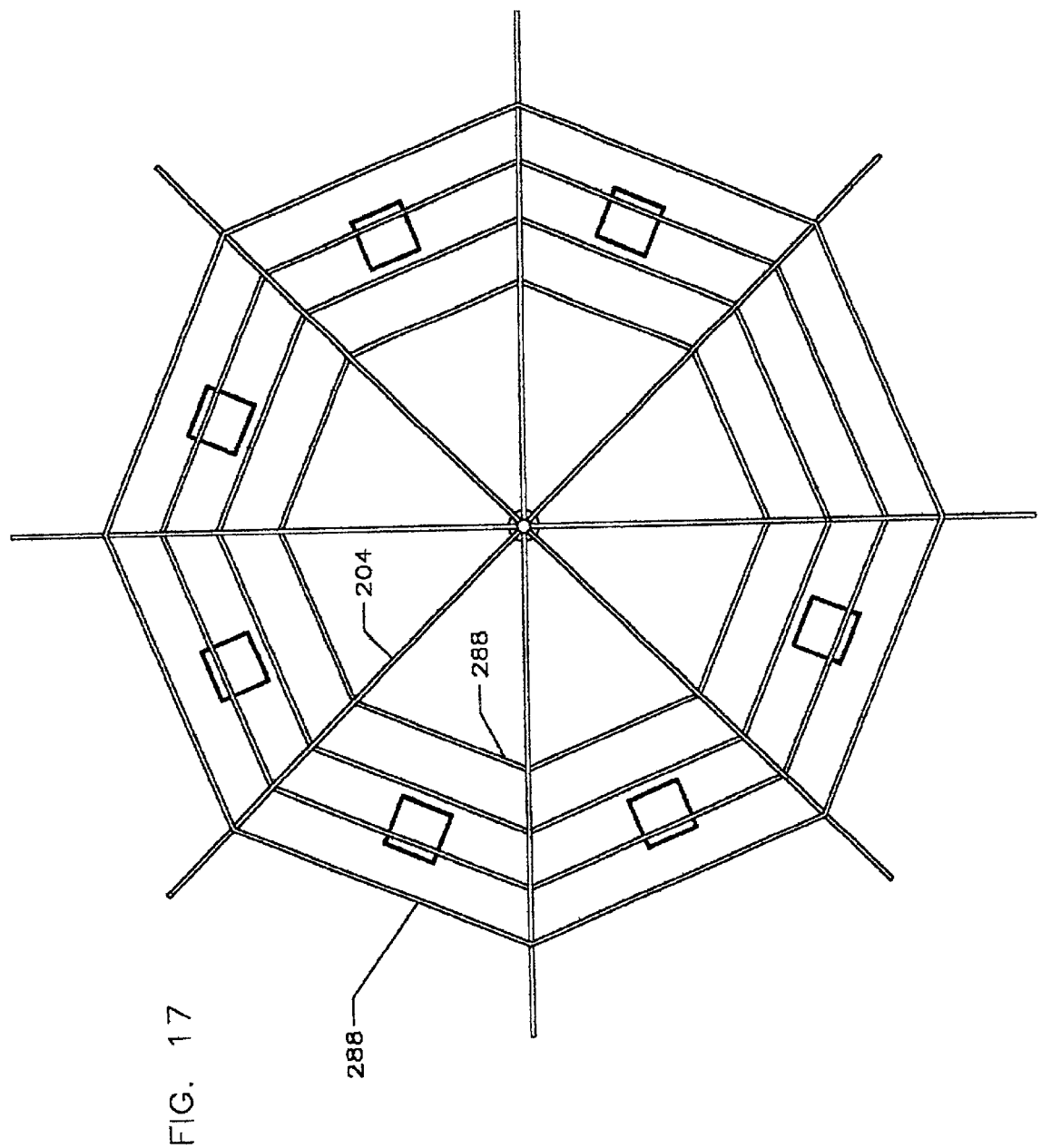
FIG. 17 is a schematic view of structural elements associated with the floor of the second story of the structure of FIG. 13, taken along line 17—17.
Figure 18:
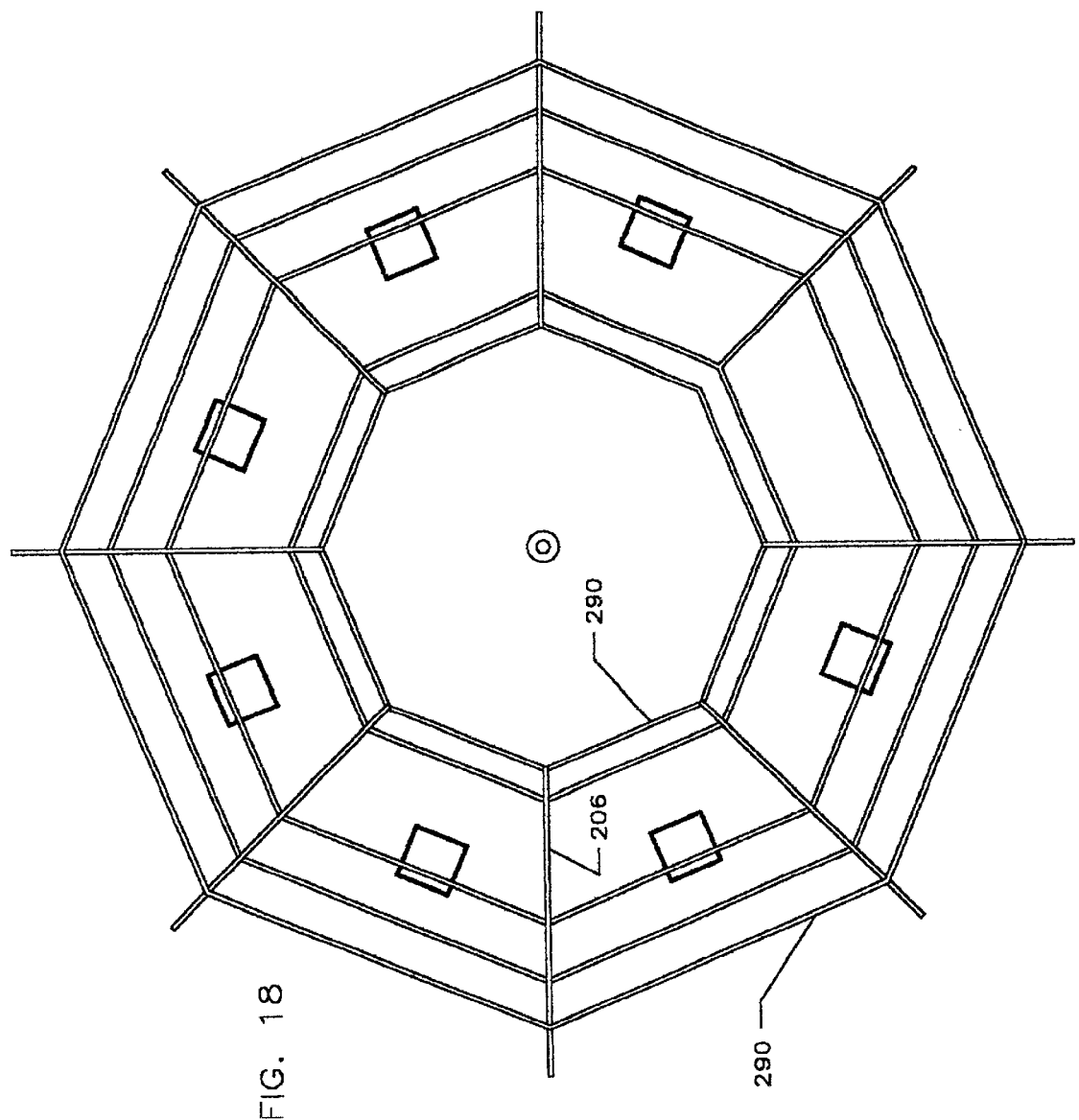
FIG. 18 is a schematic view of structural elements associated with the ceiling of the second story of the structure of FIG. 13, taken along line 18—18.
Figure 19:
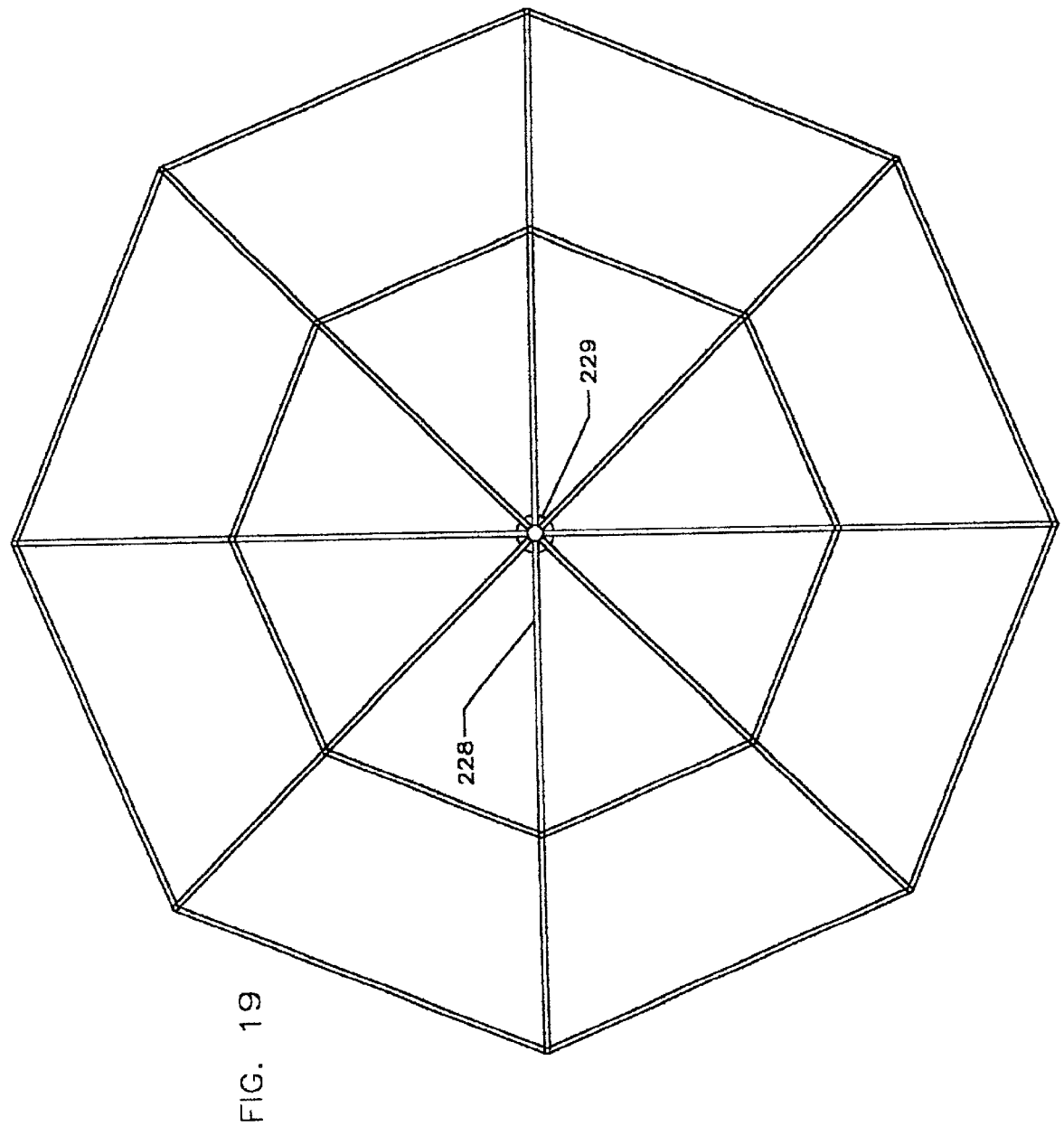
FIG. 19 is a schematic view of structural elements associated with the inner roof of the structure of FIG. 13, taken along line 19—19.

FIGS. 17 and 18 show the layout of the I-beams 204 of the second story ceiling and 206 of the second story floor/first story ceiling. The figures also show respective steel I-beams 288 and 290 spanning associated radial beams. In the example, the outer two second story floor spanning beams 290 are advantageously aligned with the walls 90 and 92. The inner two are advantageously aligned with the inner edge of the walkway 104 and first inner wall 100. An intermediate one may provide further carrying capacity for the second floor. These figures also show structure connecting the safe room walls to these I-beams.

Figure 20:
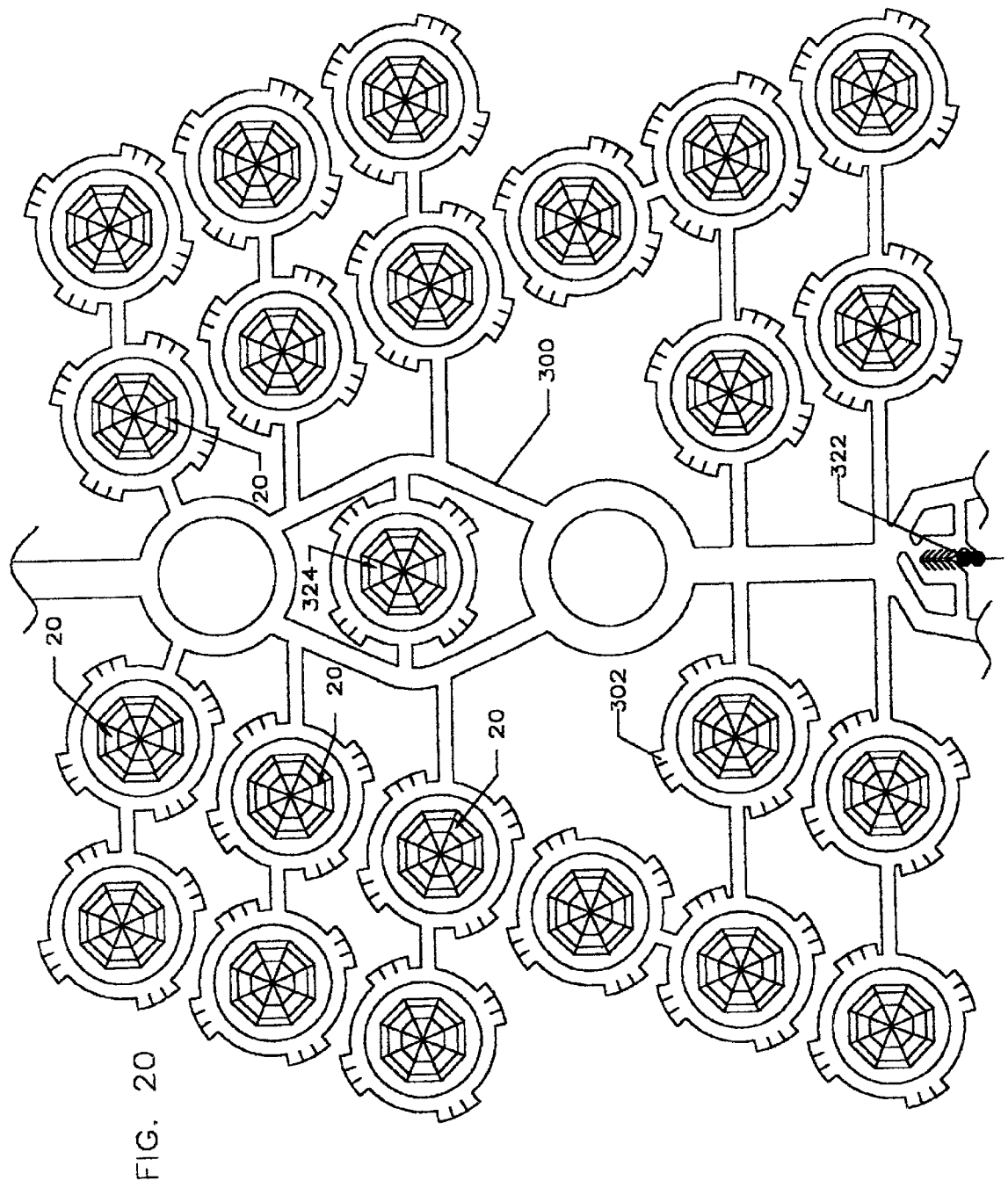
FIG. 20 is an exemplary map of a community of structures such as that of FIG. 1.

FIG. 20 shows a residential community including a plurality of structures 20. A concrete or asphalt driveway network 300 connects the clustered units. The driveway network may extend around each of the units and include a plurality of exterior parking spaces 302. For example, FIG. 20 shows four groups of three side-by-side spaces with each space separated from the adjacent space via painted lines. There may be common buildings such as mail box houses 322 and an administration or recreation center 324 which are advantageously of a complementary footprint and styling to the buildings 20. The exterior landscaping will advantageously use low lying plants including evergreens to minimize the chance of becoming projectiles.

One or more embodiments of the present invention have been described. Nevertheless, it will be understood that various modifications may be made without departing from the spirit and scope of the invention. For example, various materials and techniques may be used and the building may be sized for particular needs. Accordingly, other embodiments are within the scope of the following claims.

What is claimed is:

1. A residential structure comprising:
   an 8-sided polygonal footprint defining a central vertical axis and 8 sides of the structure;
   a number of outer individual residential units, each such outer individual residential unit occupying a sector of the footprint along an associated one of the 8-sides of the structure; inner walls separating a central common area of the outer individual residential units;
   a roof comprising an outer roof and an inner roof, the outer roof substantially covering the outer individual residential units wherein said inner and outer roofs each include a layer extending over a major portion of the inner and outer roofs and contributing to a substantial fraction of the strength of the inner and outer roofs;
   a floor separating upper and lower levels of the outer residential unit at least along a major portion of a footprint of the outer residential unit for each of the plurality of outer residential units; and
   a safe room in each of a plurality of the outer individual residential units, the safe room having on at least portions of four sides walls substantially stronger than other walls within the outer residential unit, the safe room further comprising a robust door stronger than the other walls within the outer residential unit;
   wherein each of the outer residential units includes a reinforced concrete wall having a concave arcuate outer profile along a major portion of the associated one of the 8-sides of the structure;
   whereby the residential structure is hurricane resistant.

2. A residential structure having:
   an N-sided polygonal footprint defining a central vertical axis; inner walls separating a central common area from a number of outer individual residential units, each outer individual residential unit occupying a sector of the footprint along an associated side thereof;
   an outer roof substantially covering the individual residential units; and
   an inner roof substantially covering the central common area and being operatively shiftable between lowered and raised conditions.

3. The structure claim 2 further comprising a central mast in major part supporting the inner roof at least in said raised condition.

4. The structure of claim 3 further comprising a hydraulic actuator for raising and lowering said central mast to so shift the inner roof by an amplitude of between about 2 and 10 feet.

5. The structure of claim 4 further comprising a series of remotely actuated latches for selectively securing the inner roof to the outer roof in said lowered condition.

6. The structure of claim 4 wherein said inner and outer roofs each include an aluminum/composite layer extending over a major portion of such roof and contributing to a substantial fraction of the strength of such roof.

7. The structure of claim 2 wherein each of a plurality of said outer individual residential units includes a floor separating upper and lower levels of the outer individual residential unit at least along a major portion of a footprint of the outer individual residential unit.

8. The structure of claim 2 wherein each of a plurality of said units includes walls defining a garage bay extending inward at about a 90 degree angle to the associated side, said bay having a door at an outboard end thereof, said bay and said door of effective size to permit ingress and egress of an automobile.

9. The structure of claim 1 further comprising a pool in said central common area.

10. The structure of claim 2 wherein there are N-1 such units each along an associated side, with an entry corridor extending through a remaining side to the central common area of the residential structure.

11. The structure of claim 10 further comprising a common room above said entry corridor.

12. The structure of claim 2 wherein every residential unit in the structure includes a safe room having on at least portions of four sides a reinforced concrete selected from the group consisting of poured in place concrete, cinder blocks, and precast concrete and further having a steel door; whereby the safe room is the bathroom or portion thereof.

13. The structure of claim 2 wherein each such outer individual residential unit, along a major portion of the associated side, has a reinforced concrete wall extending for a height of between about 1½ and 5 feet and having an concave arcuate outer profile.

14. The structure of claim 2 being a multi floor structure wherein second floor is inwardly offset from a first floor.

15. The structure as claimed in claim 1 wherein the inner roof is operatively shiftable between lowered and raised conditions and whereby the inner roof is and supported by a central mast when in the raised condition.

16. The structure as claimed in claim 1 wherein each of a plurality of said units includes walls defining a garage bay extending inward at a 90 degree angle to the associated side, said bay having a door at an outboard end thereof, said bay and said door of effective size to permit ingress and egress of an automobile.

17. The structure as claimed in claim 1 wherein whereby the safe room is the bathroom or portion thereof.

18. The structure as claimed in claim 1 wherein the safe room comprises walls of steel reinforced concrete selected from the group consisting of poured in place concrete, cinder blocks, and precast concrete and wherein the robust door is steel.

19. The structure as claimed in claim 1 wherein a reinforced concrete wall having an concave arcuate outer profile has a height of between about 1½ and 5 feet.

20. The structure as claimed in claim 1 wherein the structure is a two floor structure comprising a first floor and a second floor and wherein the second floor is inwardly offset from the first floor.

21. The structure as claimed in claim 1 whereby the reinforced concrete wall having a concave arcuate outer profile has a slope, concavity and material strength that assists in deflecting wind and flying debris.

* * * * *